United States Patent [19]
Dhong et al.

[11] Patent Number: 5,712,675
[45] Date of Patent: Jan. 27, 1998

[54] METHOD AND APPARATUS FOR ENHANCING LASER PRINTER RESOLUTION

[75] Inventors: Yong-bae Dhong, Kyungki-do; Soo-won Kim; Min-su Jeong, both of Seoul, all of Rep. of Korea

[73] Assignee: Chung-duck Kim, Seongnam, Rep. of Korea

[21] Appl. No.: 495,806

[22] Filed: Jun. 27, 1995

[30] Foreign Application Priority Data

May 15, 1995 [KR] Rep. of Korea .................. 95-11977

[51] Int. Cl.⁶ .................................................. B41J 2/47
[52] U.S. Cl. ......................................................... 347/254
[58] Field of Search .............................. 347/251, 247, 347/254, 240, 131; 382/269; 358/459; 395/109, 110

[56] References Cited

U.S. PATENT DOCUMENTS

| | | | |
|---|---|---|---|
| 4,724,446 | 2/1988 | Hirahara et al. | 346/76 |
| 4,771,471 | 9/1988 | Kitamura | 382/41 |
| 4,878,068 | 10/1989 | Suzuki | 346/108 |
| 5,134,495 | 7/1992 | Frazier et al. | 358/298 |
| 5,325,160 | 6/1994 | Imakawa et al. | 355/239 |
| 5,461,702 | 10/1995 | Inoue | 395/109 |
| 5,574,832 | 11/1996 | Towery et al. | 395/109 |
| 5,574,833 | 11/1996 | Yoshiaki | 395/109 |
| 5,586,225 | 12/1996 | Onizuka et al. | 395/102 |

*Primary Examiner*—Safet Metjahic
*Assistant Examiner*—Christopher E. Mahoney
*Attorney, Agent, or Firm*—Robert E. Bushnell, Esq.

[57] ABSTRACT

A resolution enhancement apparatus and method of a laser printer using a modulated laser beam is adapted to an image forming apparatus of the laser printer. It includes a memory for storing sequentially input image data in a sequential scanning method, rearranging a scanning line order and generating a 5×5 sample window. Also included are a first processor for classifying and outputting a pattern of the image data according to bitmap information in a pixel using nine 3×3 masks produced from the 5×5 sample window supplied from the memory, a second processor for using pixel density to classify data output from the first processor into a plurality of groups and outputting data of the classified groups, and a signal modulator for modulating data output from the second processor into a predetermined pattern and outputting the modulated pattern. This minimizes the use of memory space by using four row line memories and enhancing resolution by expressing finite shapes according to nineteen modulation patterns while eliminating the more severe portions of pixel magnitude variation (step phenomenon).

34 Claims, 22 Drawing Sheets

FIG. 2 (PRIOR ART)

|   | 1 | 2 | 3 | 4 | 5 | 6 | 7 |
|---|---|---|---|---|---|---|---|
| A |   |   |   | ② | ① |   |   |
| B |   |   | ① | ② | ① | ① |   |
| C |   |   |   | ④ | ① |   |   |
| D |   |   |   |   | ① |   |   |
| E |   |   |   | ④ | ① |   |   |
| F |   |   | ① | ② | ① | ① |   |
| G |   |   |   | ② | ① |   |   |

|   | 1 | 2 | 3 | 4 | 5 | 6 | 7 |
|---|---|---|---|---|---|---|---|
| A |   |   |   | ① | ② |   |   |
| B |   |   | ① | ① | ② | ① |   |
| C |   |   |   | ① | ④ |   |   |
| D |   |   |   | ① |   |   |   |
| E |   |   |   | ① | ④ |   |   |
| F |   |   | ① | ① | ② | ① |   |
| G |   |   |   | ① | ② |   |   |

|   | 1 | 2 | 3 | 4 | 5 | 6 | 7 |
|---|---|---|---|---|---|---|---|
| A |   |   | A3 | A4 | A5 |   |   |
| B |   | B2 | B3 | B4 | B5 | B6 |   |
| C | C1 | C2 | C3 | C4 | C5 | C6 | C7 |
| D | D1 | D2 | D3 | D4 | D5 | D6 | D7 |
| E | E1 | E2 | E3 | E4 | E5 | E6 | E7 |
| F |   | F2 | F3 | F4 | F5 | F6 |   |
| G |   |   | G3 | G4 | G5 |   |   |

BLACK

L2

R2

(UP2,DN2)

WHITE

| p[0][0] | p[0][1] | p[0][2] | p[0][3] | p[0][4] |
|---|---|---|---|---|
| p[1][0] | p[1][1] | p[1][2] | p[1][3] | p[1][4] |
| p[2][0] | p[2][1] | p[2][2] | p[2][3] | p[2][4] |
| p[3][0] | p[3][1] | p[3][2] | p[3][3] | p[3][4] |
| p[4][0] | p[4][1] | p[4][2] | p[4][3] | p[4][4] |

FIG. 12B

| p[j-1][i-1] | p[j-1][i] | p[j-1][i+1] |
|---|---|---|
| p[j][i-1] | p[j][i] | p[j][i+1] |
| p[j+1][i-1] | p[j+1][i] | p[j+1][i+1] |

FIG. 13

| MASK1 | MASK2 | MASK3 | MASK4 |
|---|---|---|---|
| X 0 X / 1 0 1 / X 1 X | X 1 X / 0 0 1 / X 1 X | X 1 X / 1 0 1 / X 0 X | X 1 X / 1 0 0 / X 1 X |

| MASK5 | MASK6 | MASK7 | MASK8 |
|---|---|---|---|
| X 0 1 / X 0 1 / 0 1 X | X X 0 / 0 0 1 / 1 1 X | 0 1 X / X 0 1 / X 0 1 | 1 1 X / 0 0 1 / X X 0 |

| MASK9 | MASK10 | MASK11 | MASK12 |
|---|---|---|---|
| X 1 X / 1 0 X / 1 0 X | X 1 1 / 1 0 0 / 0 X X | 0 X X / 1 0 0 / X 1 1 | 1 0 X / 1 0 X / X 1 0 |

| MASK13 | MASK14 | MASK15 | MASK16 |
|---|---|---|---|
| X 0 0 / 0 0 1 / 0 1 X | 0 1 X / 0 0 1 / X 0 0 | X 1 0 / 1 0 0 / 0 0 X | 0 0 X / 1 0 0 / X 1 0 |

| MASK17 | MASK18 | MASK19 | MASK20 |
|---|---|---|---|
| X 0 1 / X 1 1 / 0 1 X | X X 0 / 0 1 1 / 1 1 X | 0 1 X / X 1 1 / X 0 1 | 1 1 X / 0 1 1 / X X 0 |

| MASK21 | MASK22 | MASK23 | MASK24 |
|---|---|---|---|
| X 1 0 / 1 1 X / 1 0 X | X 1 1 / 1 1 0 / 0 X X | 0 X X / 1 1 0 / X 1 1 | 1 0 X / 1 1 X / X 1 0 |

| MASK25 | MASK26 | MASK27 | MASK28 |
|---|---|---|---|
| 1 0 X / 1 0 0 / X 1 1 | X 0 1 / 0 0 1 / 1 1 X | 1 1 X / 0 0 1 / X 0 1 | X 1 1 / 1 0 0 / 1 0 X |

| MASK29 | MASK30 | MASK31 | MASK32 |
|---|---|---|---|
| 0 0 0 / 0 1 1 / 0 1 X | 0 0 0 / 1 1 0 / X 1 0 | 0 1 X / 0 1 1 / 0 0 0 | X 1 0 / 1 1 0 / 0 0 0 |

METHOD AND APPARATUS FOR ENHANCING LASER PRINTER RESOLUTION

BACKGROUND OF THE INVENTION

The present invention relates to an image formation apparatus for a laser printer, and more particularly, to a method and apparatus for enhancing the resolution of a laser printer by using a laser beam modulation technique.

Generally, in a laser printer, a laser beam is driven according to an input image, a drum is electrically charged, and toner (being oppositely charged) is adhered to the drum. The drum-adhered toner is then transferred onto a sheet of paper by heating, to thus produce (print) an output image corresponding to the input image. Here, the signal used for driving the laser beam is in the form of an image bitmap signal.

To enhance resolution in such a laser printer, that is to print an image with greater precision and fineness, one or more requirements must be met. That is, the capacity of a buffer memory should be increased, the powder of the toner should be very fine, and/or an electromagnetic process of the drum motor should be improved for smooth operation even in high-resolution conditions, all of which, however, result in cost increases.

An image formation apparatus which can increase resolution in the laser printer using a laser beam modulation technique without the need for a larger capacity memory or high-resolution drum motor, is disclosed in Japanese Patent Laid-open Publication No. 89-323959 (Matsushida), as shown in FIG. 1. Here, a laser beam modulation technique controls the quantity and position of an electrical charge on the drum, by varying the shape of a pulse of a laser beam driver according to an image pattern. Since the amount and position of the drum-adhered toner can be precisely determined by variation of the electrical charges, such a technique can ultimately increase the resolution of the laser printer.

Referring to FIG. 1, the conventional image formation apparatus is composed of a memory portion 110, an edge detector 120, a weight processor 130, a logic operation 140, a correction controller 150, a signal generator 160, and an edge data selector 170.

The FIG. 1 apparatus shows a technology for determining an image pattern from 7×7 window information (refer FIG. 6) and processing the determined image pattern. To briefly explain an algorithm for determining an image pattern, a weight value is assigned to an edge in weight value processor 130 when a specific portion in FIG. 6 is determined as an edge. Then, the assigned weight values are summed, the result being compared with a number representing a predetermined reference pattern to determine the pattern which will ultimately be printed.

In more detail, memory portion 110 produces a bitmap data window for processing a signal and is composed of a 7-row 4,096-column (bit) memory circuit 111, a sample window generator 112 and a memory controller 113. Memory circuit 111 is a first-in-first-out (FIFO) memory composed of a 7-row 4,096-column flip-flop, and the sample window generator 112 produces sample window data using the data from memory circuit 111. Meanwhile, the memory controller 113 controls memory circuit 111 to enable video input data from a laser printer controller (not shown) to be sequentially stored therein and outputs a pixel clock for external circuitry synchronization. Here, the horizontal synchronization (Hsync) signal is also supplied from the laser printer controller.

In the operation of memory portion 110, first, the input video data is sequentially stored in memory circuit 111, bit by bit, starting from the seventh row. Whenever one bit is stored in memory portion 110, the value of a counter in memory controller 113 increases by one. When the counter value reaches the number of dots corresponding to the printed width of the paper, the data in the seventh row is shifted to the sixth row and the counter is reset to zero so that the input video data can again be stored in the seventh row. When the seventh row again becomes full, the data therein is shifted to the sixth row and the data in the sixth row is shifted to the fifth row. In this manner, the lastly input data is always stored in the seventh row, with the previously input data being sequentially stored in the other rows in the same manner on down to the first row. Thus, sample window generator 112 produces a sample window as shown in FIG. 6, from the seven rows of memory circuit 111. Here, assuming that D4 (Dth row, fourth column) is the current position of a pixel to be processed in memory circuit 111, sample window generator 112 reads out the third through fifth columns in all rows (A through G), the second through sixth columns in the Bth to Fth rows, and the first through seventh columns in the Cth, Dth and Eth rows, to produce a 7×7 sample window.

Figures 4, 5:
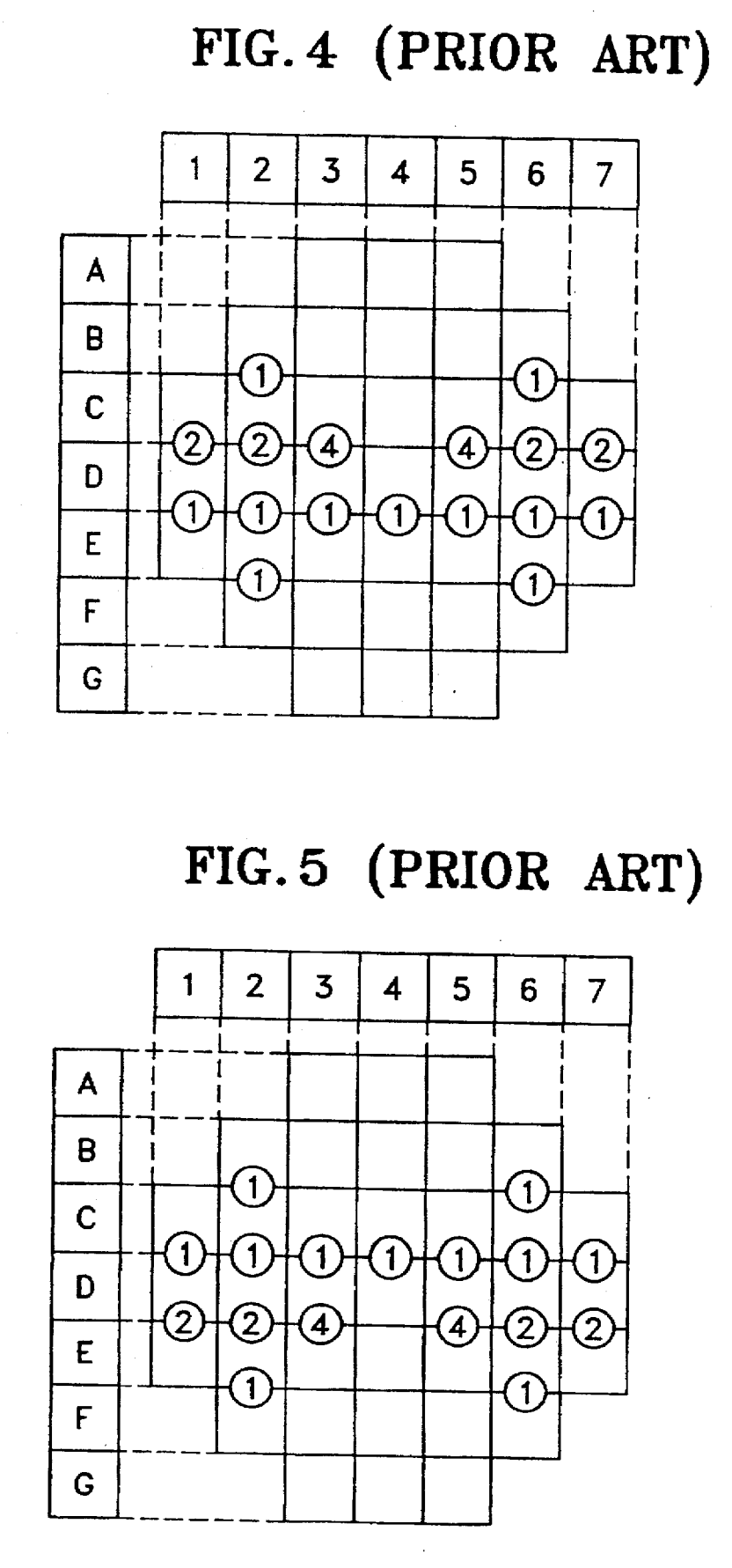

FIGS. 2–5 show image patterns for right- left- bottom- and top-edge detection in the edge detector of FIG. 1, respectively. Here, each circle represents an edge and has an assigned weight value of 1, 2 or 4. Edge detector 120 detects an intermediate portion (edge) between pixels when the bitmap data of two adjacent pixels differ, i.e., detects whether a circle shown in FIGS. 2–5 is an edge. Edge detection is classified as one of four different types (left-, right-, top- and bottom-edges) according to the relationship between the current pixel (i.e., D4) and its periphery pixels, and is controlled by edge data selector 170 which selects one kind of edge detection to thereby determine the direction, i.e., left (L), right (R), up (UP) or down (DN), of the edge.

Once a circled portion (pixel boundary) is detected as an edge by edge detector 120, weight value processor 130 assigns the weight values of each circle shown in FIGS. 2–5.

Logic operator 140 sums the edges to which the weight values are assigned, compares the summed result with a predetermined value, determines a modulation pattern, and outputs correction data based on the modulation pattern.

Correction controller 150 outputs a correction control signal for controlling the correction of image data D4 according to the correction data output from logic operator 140.

Signal generator 160 produces a modulation signal to be supplied to a laser driver (not shown) according to the correction control signal output from correction controller 150.

Edge data selector 170 determines one edge detection pattern among the edge detection patterns shown in FIGS. 2–5, according to relationship between a pixel currently being processed, that is, D4 of FIG. 6 and the periphery pixels, as described above. The edge pattern of D4 is classified with a left-central edge, a right-central edge, an upper-central edge and a lower-central edge. With respect to the following cases, edge detection patterns are selected as shown in FIGS. 2–5. That is, when D4[bitmap] is not equal to D5[bitmap], the right-central edge pattern is selected; when D4[bitmap] is not equal to D3[bitmap], the left-central edge pattern is selected; when D4[bitmap] is not equal to E4[bitmap], the lower-central edge pattern is selected; and when D4[bitmap] is not equal to C4[bitmap], the upper-central edge pattern is selected.

As described above, the respective forms of edge detection designate a pixel boundary as an edge when the bitmap values of either of the pixel differ from the other. For example, the circle (pixel boundary) between C3 and C4 in FIG. 2 is designated as an edge when C3 and C4 have differing bitmap data values, and thus, ED2 is an edge when C3[bitmap] is not equal to C4. Further, each detected edge has a weight value (the numerical figure within the circle) according to each edge detection pattern, which is processed in weight value processor 130. For example, in FIG. 2, if ED2 is an edge, a weight value (in this case, "4") is placed in the circle ED2, and a "0" is placed therein if it is not an edge.

Logic operator 140 sums the weight values which have been assigned by weight value processor 130, compares the summed result with predetermined values and determines a modulation pattern. The comparison is accomplished with various predetermined values, upon the result of which one modulation pattern is determined among the eight patterns of FIGS. 7A–7H, wherein a modulation pattern may be classified as a black-pixel type (FIGS. 7A–7D) or a white-pixel type (FIGS. 7E–7H). Thus, there are eight such modulation patterns: (FIG. 7A) when a laser drive signal is given for a certain pixel; (FIG. 7B) when a laser drive signal is given for the left-side two-thirds portion of a certain pixel; (FIG. 7C) when a laser drive signal is given for the right-side two-thirds portion of a certain pixel; (FIG. 7D) when a laser drive signal is given for the central two-thirds portion of a certain pixel; (FIG. 7E) when a laser drive signal is not given for a certain pixel; (FIG. 7F) when a laser drive signal is given for the left-side one-third portion of a certain pixel; (FIG. 7G) when a laser drive signal is given for the right-side one-third portion of a certain pixel; and (FIG. 7H) when a laser drive signal is given for the central one-third portion of a certain pixel. As shown in FIGS. 7A–7H, there are ten actual dot patterns owing to the up-direction and down-direction pixel arrangements, since a pixel modulation pattern has both up-direction and down-direction modulation patterns when the laser drive signal is given for the central portion of the pixel.

Correction controller 150 performs a correction operation according to the modulation pattern determined in logic operator 140. Then, signal generator 160 sends a modulation signal to a laser beam printer 6 of FIG. 8. Signal generator 160 has the eight modulation patterns of FIGS. 7A–7H, i.e., six modulation patterns and the 100% and 0% conditions. In FIG. 7D, the modulation pattern (UP2, DN2) is made by just one modulation signal. Here, If a pixel which is located above the current pixel is a 100% black pixel, the modulation pattern becomes an up-direction modulation pattern UP2, while if a pixel which is located below the current pixel is a 100% black pixel, the modulation pattern becomes a down-direction modulation pattern DN2. The modulation pattern of FIG. 7H (UP1, DN1) is created in the same manner.

In the above-described conventional art, the seven 4,096-bit lines use a total of 28,672 bits for A4-sized paper, with a larger memory capacity being needed when A3-sized paper is used. Accordingly, when a corresponding memory is realized in a single chip, the total size of the whole chip becomes large due to the size of the memory. Also, besides the 100% and 0% conditions, the conventional technology is limited to just six possible modulation methods. Thus, various kinds of dot patterns cannot be adapted to accomplish a desired resolution increase.

In U.S. Pat. No. 4,933,689 issued on Jun. 12, 1990 as another form of the conventional art, the number of dots capable of being represented per inch is not increased, but a technology of bringing a high-resolution effect by minutely adjusting the thickness and position of a dot is disclosed. Here, a clock pulse is modulated to adjust an interval and intensity of a laser beam and to then obtain a particular dot pattern. The dot pattern is then matched against a prestored set of data on a real-time basis, to adjust the center position of a dot in the horizontal direction by thirds and fix the dot size in the vertical direction. Accordingly, a curved surface and linear component of the character can be smoothened to improve a problem of a step phenomenon. However, only the curved surface can be smoothened. Problems such as a position error and shape distortion cannot be solved.

A double scanning line method as yet another form of the conventional art suppresses the need to increase memory size by using a data compression technique for enhancing horizontal and vertical resolution by two times or more. However, this method has a drawback in that linear lines differ from each other in thickness and vertical resolution is limited to no more than twice.

SUMMARY OF THE INVENTION

To solve the above problems, it is an object of the present invention to provide a resolution enhancement apparatus in a laser printer capable of minimizing the use of a memory and reducing production costs.

It is another object of the present invention to provide an apparatus for enhancing vertical and horizontal resolution in a laser printer by minutely expressing a pixel according to a laser beam modulation pattern.

It is still another object of the present invention to provide a resolution enhancement apparatus in a laser printer for enhancing resolution more than two times by removing a portion having a severe variation of pixel magnitude.

It is yet another object of the present invention to provide a resolution enhancement method in a laser printer which is adapted to a resolution enhancement apparatus in the laser printer.

To accomplish the above object according to the present invention, there is provided a resolution enhancement apparatus of a laser printer which reads stored image data and modulates the read image data, the apparatus comprising: memory means for storing sequentially input image data in a sequential scanning method, rearranging a scanning line order and generating an M×M sample window, M being an integer; first processing means for classifying and outputting patterns of the image data according to bitmap information in a sample window using $(M-2)^2$ 3×3 masks produced from the M×M sample window supplied from the memory means; second processing means for classifying the data output from the first processing means into a plurality of groups by using pixel density and outputting the classified group data; and signal modulation means for modulating the data output from the second processing means into a predetermined pattern and outputting the modulated pattern.

Another object of the present invention can be accomplished by providing a resolution enhancement method of a laser printer which reads image data in a memory and modulates the read image data under the control of a controller, the method comprising the steps of: storing sequentially input image data in a sequential scanning method, rearranging a scanning line order and generating an M×M sample window, M being an integer; firstly processing by classifying and outputting a pattern of the image data according to bitmap information in a pixel using $(M-2)^2$ 3×3 masks produced from the M×M sample window supplied from the memory; secondly processing by using pixel density to classify data output from the first processing step into a plurality of groups and outputting the classified group data; and modulating data output from the second processing step into a predetermined pattern and outputting the modulated pattern.

BRIEF DESCRIPTION OF THE DRAWINGS

Further features and advantages of the present invention will become more apparent from the following description, reference being made to accompanying drawings wherein a preferred embodiment of present invention is clearly shown.

In the drawings:

FIGS. 2–5 show image patterns for right-, left-, bottom- and top-edge detections in the edge detector of FIG. 1, respectively;

FIG. 6 shows a sample window in a sample window generator of FIG. 1;

FIGS. 12A and 12B show sample windows of the memory portion and first processor of FIG. 9, respectively;

FIG. 13 shows a mask pattern diagram of the first processor of FIG. 9;

DETAILED DESCRIPTION OF THE INVENTION

Figure 1:
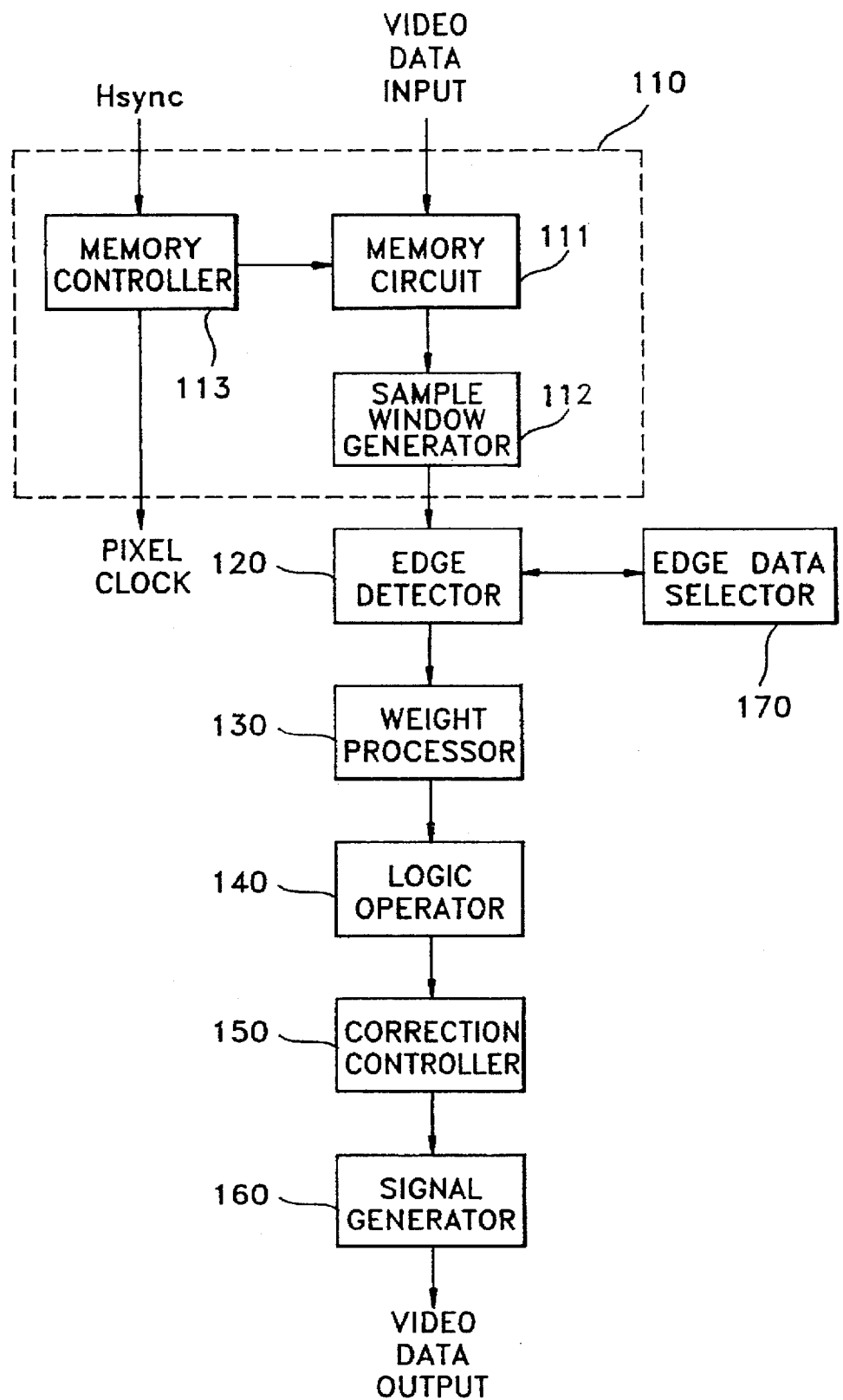
FIG. 1 is a block diagram of a conventional image formation apparatus in a laser printer.
Figure 7A:
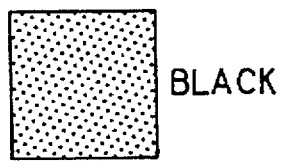
FIGS. 7A–7H show dot patterns with respect to a correction image dot modulation signal in the image formation apparatus of FIG. 1.
Figure 7B:
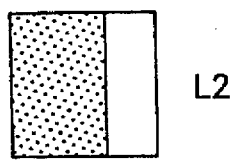
Figure 7C:
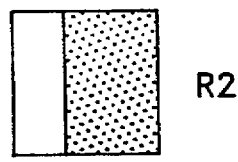
Figure 7D:
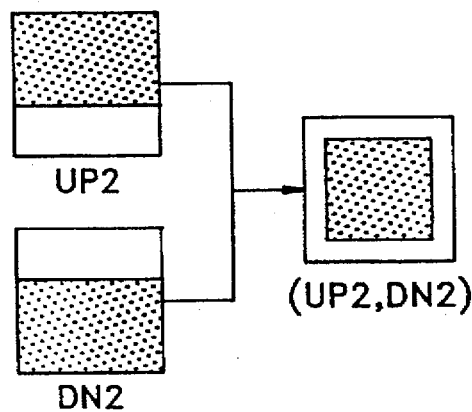
Figure 7E:
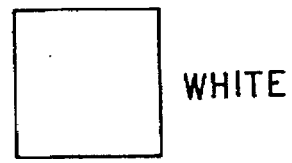
Figure 7F:
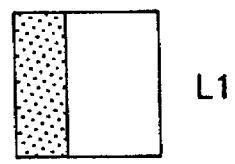
Figure 7G:
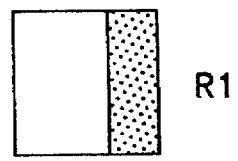
Figure 7H:
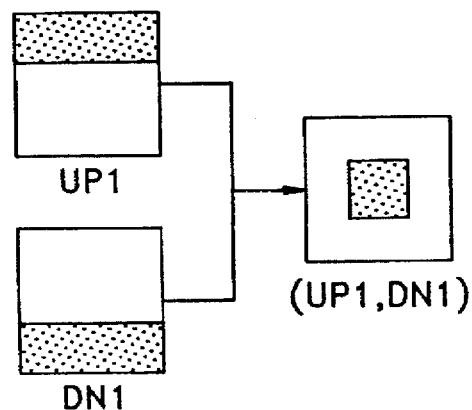
Figure 8:
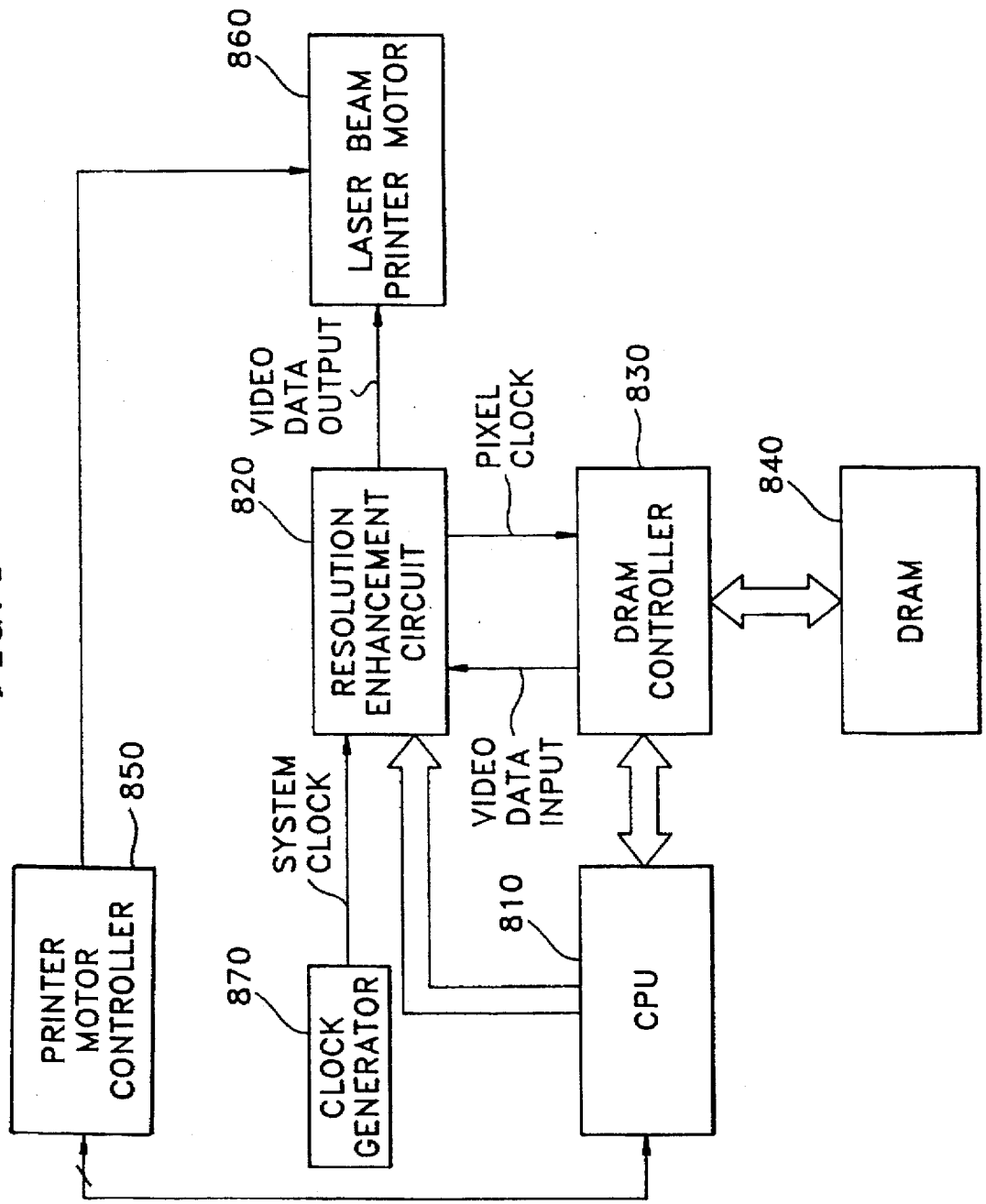
FIG. 8 is a block diagram of a laser printer adopting a resolution enhancing method and apparatus to which the present invention is adapted.

A resolution enhancement apparatus in a laser printer according to a preferred embodiment of the present invention relates to an actual embodying method of an algorithm of a portion corresponding to a resolution enhancement circuit 820 in the laser printer shown in FIG. 8. A printing process of the laser printer is performed by supplying information stored in a dynamic random access memory (DRAM) 840 to a laser beam printer motor 860 via a DRAM controller 830 and resolution enhancement circuit 820. If a printing instruction is given by a central processing unit (CPU) 801, DRAM controller 830 reads bitmap data from DRAM 840 and sends the read data sequentially to resolution enhancement circuit 820. Resolution enhancement circuit 820 sends a pixel clock to DRAM controller 830 in synchronization with serially input video data, processes the video data input signal and sends the result to laser beam printer motor 860 for printing. A printer controller 850 receives horizontal and vertical sync signals from CPU 810 and controls the movement of laser beam printer motor 860. The control signal supplied to resolution enhancement circuit 820 from CPU 810 controls the various modes thereof. A clock generator 870 generates a system clock for the synchronization of resolution enhancement circuit 820.

The output of DRAM controller 830, that is, the video data input signal to resolution enhancement circuit 820 of FIG. 8, is bitmap data of an image to be printed. Resolution enhancement circuit 820 receives the bitmap data to determine an image pattern, and sends a modulated signal to a laser beam driver (not shown) of the laser beam printer, so that resolution can be enhanced according to the image pattern. In this embodiment, an image pattern determining method adopts a method of reading bitmap image of a 5×5 sample window and performing a two-step process. Here, there are two modes of operation, an "8" mode and a "4" mode, according to modulation ratio. In 4-mode operation, the system clock from clock generator 870 has a frequency four times that of a bitmap sync clock for modulation operations, i.e., the pixel clock; while the frequency of the system clock in 8-mode operation is eight times the pixel clock. Therefore, 8-mode operation allows for more patterns than 4-mode operation. However, since 8-mode operation modulates each pixel with eight system clock pulses, a limitation would occur if used for a high speed system; hence, 4-mode operation is used for high speed systems. For example, the pixel clock frequency of a 600 dpi–16 ppm system is 16 MHz, a 128 MHz system clock is necessary for use in the "8" mode. Such a high clock frequency requires additional synchronization circuitry such as a phase-locked loop, thereby increasing production costs.

Figure 9:
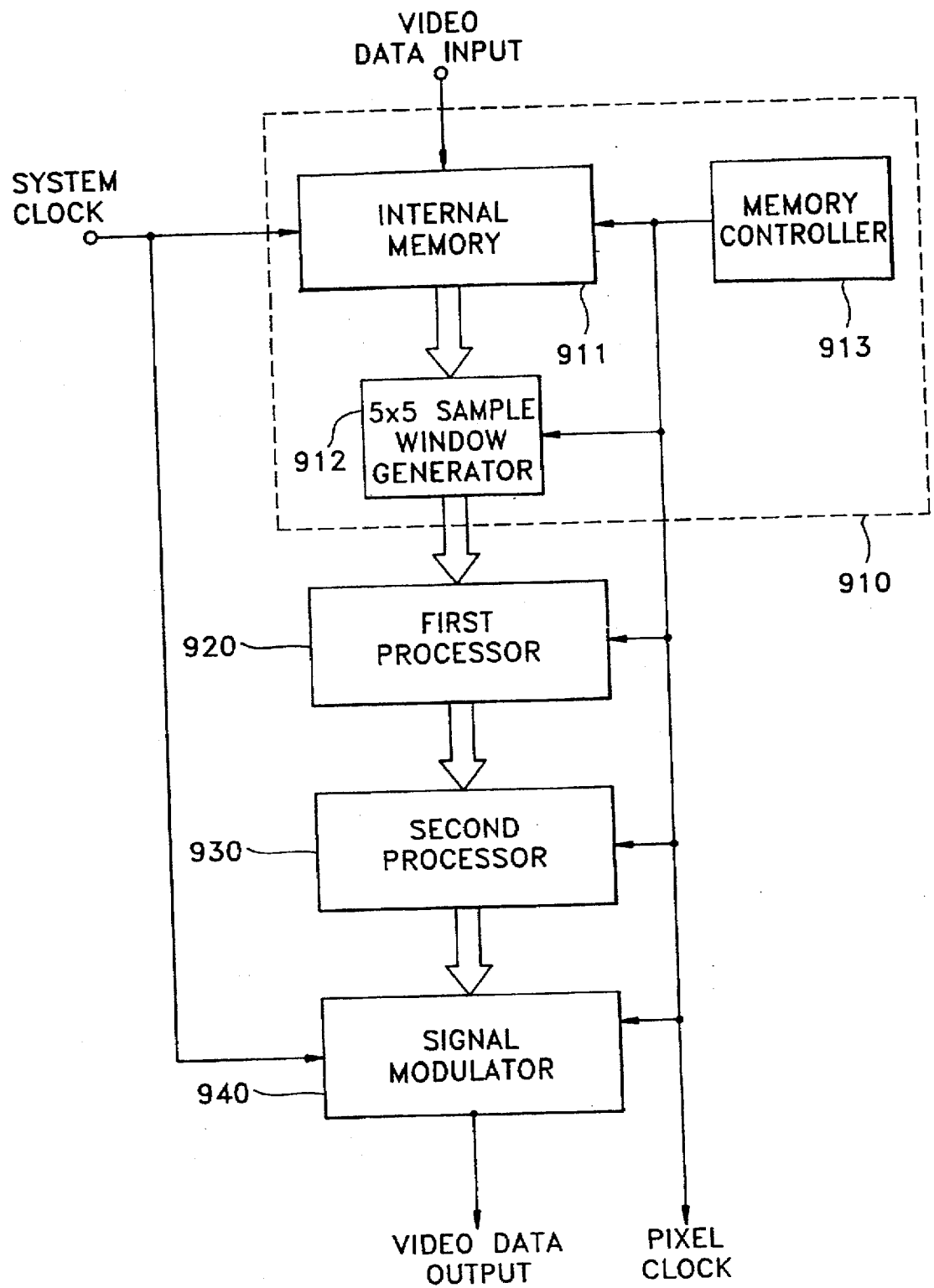
FIG. 9 is a block diagram of a resolution enhancing apparatus in a laser printer according to a preferred embodiment of the present invention.

The resolution enhancement apparatus of the laser printer in this embodiment includes a memory portion 910, a first processor 920, a second processor 930 and a signal modulator 940, as shown in FIG. 9.

The operation of this embodiment will be briefly described by referring to FIG. 9. Here, a 5×5 sample window is produced in memory portion 910. First processor 920 receives the 5×5 sample window and outputs image data of 3×3 sample window with respect to a center pixel and eight pixels of the 5×5 sample window. Second processor 930 processes the image data of the 3×3 sample window centering on the center pixel and determines a proper processing pattern corresponding to the 3×3 sample window. Then, signal modulator 940 produces a modulated signal according to the processing pattern.

In FIG. 9, memory portion 910 stores the serially input video data bitmap supplied from DRAM controller 830 of FIG. 8, and produces a 5×5 sample window so as to be processed in the following stage. Memory portion 910 includes a memory 911, a 5×5 sample window generator 912, and a memory controller 913. Memory 911 has an 8 Kb capacity composed of four rows, which is designed to be adapted to laser printers using an A4 sheet which uses 4K-bits per row and to an A3 sheet which uses 8K-bits per row, and receives the video data input from DRAM controller 830. Memory controller 913 is synchronized with the video data input and supplies the pixel clock to DRAM controller 830 of FIG. 8. Also, memory 911 receives the system clock from clock generator 870 of FIG. 8. Although not shown in FIG. 9, memory portion 910 also receives a control signal from CPU 810 of FIG. 8. Memory 911 and 5×5 sample window generator 912 operate under the control of memory controller 913.

Figure 10:
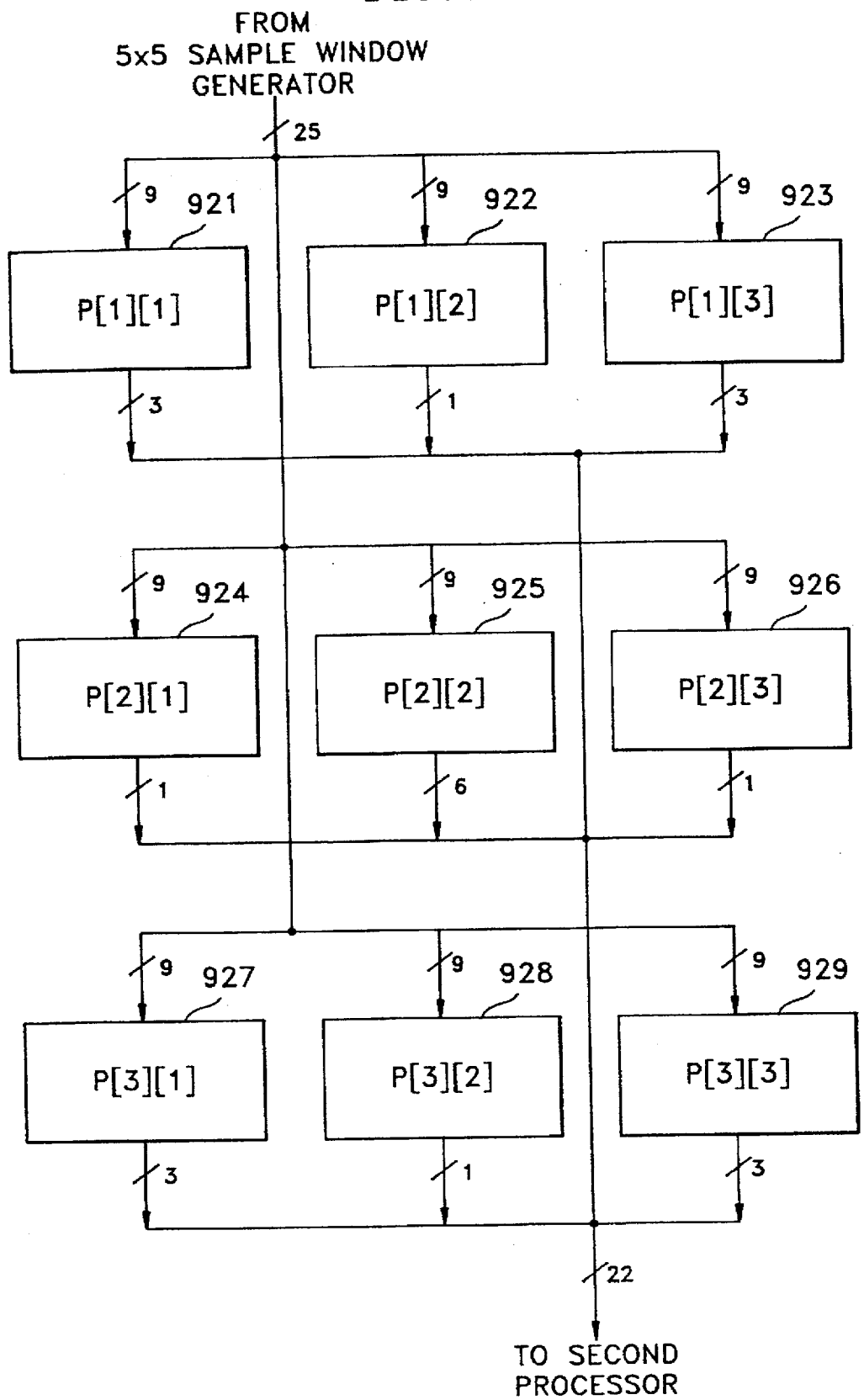
FIG. 10 is a block diagram of the first processor shown in FIG. 9.

As shown in FIG. 10, first processor 920 includes nine parallel processors 921–929 in the form of nine data registers, each operating independently of the others. In FIG. 10, p[j][i] represents the pixel of the jth row and ith column. Each parallel processor in first processor 920 determines one coincident mask among thirty-two patterns from mask 1 to mask 32 shown in FIG. 13, and, according to the coincident mask, outputs predetermined data Dp[j][i][D(5:0)] to second processor 930. Here, first processor 920 does not separately produce 3×3 sample windows which become an input of each of parallel processor 921–929; rather each parallel processor of FIG. 10 selectively connects the processor inputs from the 5×5 sample window as shown in FIG. 12A, to form a 3×3 sample window as shown in FIG. 12B. As a result, a total of nine 3×3 sample windows are formed.

Second processor 930 uses values of the data register in the 3×3 sample window processed in first processor 920, that is, Dp[1][2], Dp[3][2], Dp[2][1] and Dp[2][3] which are located up, down, left and right of p[2][2], and determines a group classification A, B or C (described later). Second processor 930 uses values of the data register of Dp[1][1], Dp[1][3], Dp[3][1] and Dp[3][3] in the diagonal direction of the remainder Dp[2][2], to perform a specific process with respect to Group D (described later).

Signal modulator 940 receives the system clock from clock generator 870 of FIG. 8, determines a modulation pattern according to the result of second processor 930, and outputs a modulated signal to drive laser beam printer motor 860. Signal modulator 940 uses a ⅘ flag for discriminating between 4-mode and 8-mode operation by a control signal from CPU 810, and a thickness flag for determining a thin mode and a thick mode, which can be designed to be used flexibly for various applications. There are nineteen modulation signals in 8-mode operation and fourteen in 4-mode operation, with the mode being determined by a user.

As shown in FIG. 9, first processor 920, second processor 930 and signal modulator 940 operate in synchronization with the pixel clock output from memory controller 913.

Figure 11:
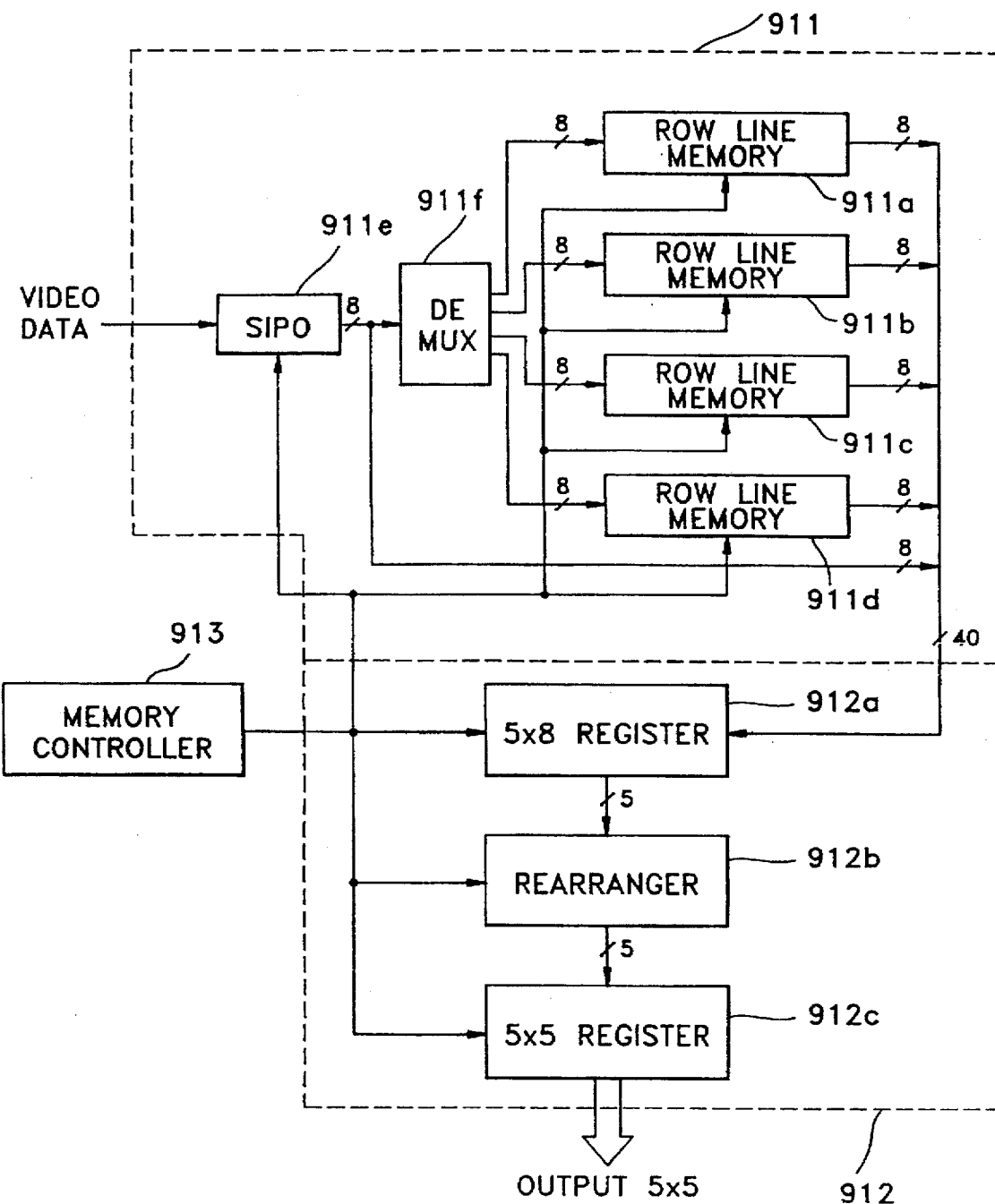
FIG. 11 is a detailed block diagram of the memory portion shown in FIG. 9.

Memory portion 910 receives the video data input signal, a sequentially scanned input from DRAM controller 830, and stores the received input signal according to the horizontal width of the printed page from the first row of memory 911. FIG. 11 is a detailed block diagram of memory portion 910 of FIG. 9. In FIG. 11, a serial-in-parallel-output (SIPO) portion 911e including an 8-bit shift register receives 8-bit video data from DRAM controller 830 of FIG. 8 and shifts the received input data by one byte to a designated row every eighth clock pulse. In this way, SIPO portion 911e converts a serial input into an 8-bit parallel output. A demultiplexer 911f receives the converted 8-bit parallel data to be output to row line memories 911a–911d. The row line memories each store bitmap data corresponding to one row, in byte units. A 5×8 register 912a stores the output of memory 911, in byte units. A rearranger 912b rearranges the sequence of an input row, to match the row sequence of the original bitmap image data. Rearranger 912b counts rows changes and changes the row sequence according to the counted result by using a multiplexer.

The output of SIPO portion 911e is also applied directly to the input of 5×8 register 912a as shown in FIG. 11. The 5×8 register 912a is used for producing a 5×5 sample window together with four row line memories 911a–911d and SIPO 911e. That is, information of 8-bit SIPO portion 911e for storing the sequential input from DRAM controller 830 shown in FIG. 8 is applied also to the fifth input constituting the 5×5 sample window, and is also used as input signal of the row which is currently designated to store via demultiplexer 911f. By using such a structure, a 5×5 sample window can be produced using just four row line memories 911a–911d instead of five. However, the video data input signal supplied from DRAM controller 830 is converted by SIPO portion 911e. Thereafter, the output value of SIPO portion 911e is stored in row line memory 911a if the value of a counter (not shown) is 0, is stored in row line memory 911b if the counter value is 1, is stored in row line memory 911c if the counter value is 2, and is stored in row line memory 911d if the counter value is 3, via demultiplexer 911f. That is, the output of SIPO portion 911e is filled from the first row according to a sequence of row line memories 911a–911d. Thereafter, when the fourth row is filled with the output value of the SIPO portion 911e, the first row starts filling again. Accordingly, the sequence of row line memories 911a–911d differs from the sequence of the input signal row. Thus, rearranger 912b has information with respect to the sequence and uses the sequence information to rearrange the information from row line memories 911a–911d to coincide with the sequence of the 5×5 sample window. For example, when input data enters in the sequence of rows A, B, C, D, E and F, row A is stored in the first row of the row line memory, row B is stored in the second row thereof, row C is stored in the third row thereof, and row D is stored in the fourth row thereof. Then, row E is again stored in the first row thereof. When row F is filled, the output of the row line memory becomes a sequence of the rows of E, B, C and D. Then, row F is entered as the fifth row, and the 5×8 register 912a stores data in sequence of E, B, C, D and F. Therefore, this sequence should be changed for processing of first processor 920. Rearranger 912b rearranges the data in sequence of B, C, D, E and F. Therefore, four row line memories 911a–911d need not shift the data from the lower row to the upper row to match a sequence of the data. Accordingly, a shift register is not needed between the respective rows.

As shown in FIG. 10, each processor in first processor 920 determines an output result according to a result whether data of one pixel and eight peripheral pixels in the 3×3 sample window as shown in FIG. 12B coincides with one among from mask 1 to mask 32 of FIG. 13. A method for determining whether input data of first processor 920 coincides with mask patterns is logically designed by comparing the bitmap data in the mask with the bitmap data of the video data inputs and outputting a "1" if the result coincides with the 3×3 sample window of FIG. 12B. Each processor stores an output having direction information and density information with respect to pixel data p[1][1] through p[3][3] in registers of Dp[1][1] through Dp[3][3]. As shown in Table 1, this output is composed of six bits in which bits D5, D4 and D3 have information in connection with directions, and bits D2, D1 and D0 have information in connection with densities. The direction information is classified into six kinds, and the density information is classified into seven kinds. However, each processor outputs only the bits necessary in second processor 930 among six bits according to the position of the pixel to be processed, as shown in the output data of FIG. 10. For example, when the pixel data p[2][2] is processed, a value of pixel data p[2][2] and eight values of the peripheral pixel data are compared with values of mask 1 to mask 32 to determine a pattern. If the pixel data p[2][2] coincides with mask 12, direction information is "L" and density information has a value of 50%, this results in Dp[2][2][D5, D4, D3, D2, D1, D0], that is, "110100." When the input, that is, the shape of the 3×3 sample window in the center of each processing pixel, coincides with one from mask 1 to mask 32 at the processing of the center pixel of FIG. 12B, each processor outputs a processing result with respect to the mask. The processing results of the respective masks are represented follows.

In pixels p[j−1][i−1] through p[j+1][i+1]:

when mask 1, p[j][i]=TB and dot density=50%;
when mask 2, p[j][i]=R and dot density=50%;
when mask 3, p[j][i]=TB and dot density=50%;
when mask 4, p[j][i]=L and dot density=50%;
when mask 5, p[j][i]=R and dot density=50%;
when mask 6, p[j][i]=TB and dot density=50%;
when mask 7, p[j][i]=R and dot density=50%;
when mask 8, p[j][i]=TB and dot density=50%;
when mask 9, p[j][i]=L and dot density=50%;
when mask 10, p[j][i]=TB and dot density=50%;
when mask 11, p[j][i]=TB and dot density=50%;
when mask 12, p[j][i]=L and dot density=50%;
when mask 13, p[j][i]=CR and dot density=25%;
when mask 14, p[j][i]=CR and dot density=25%;
when mask 15, p[j][i]=CL and dot density=25%;
when mask 16, p[j][i]=CL and dot density=25%;
when mask 17, p[j][i]=R and dot density=62.5%;
when mask 18, p[j][i]=TB and dot density=62.5%;
when mask 19, p[j][i]=R and dot density=62.5%;
when mask 20, p[j][i]=TB and dot density=62.5%;
when mask 21, p[j][i]=L and dot density=62.5%;
when mask 22, p[j][i]=TB and dot density=62.5%;
when mask 23, p[j][i]=TB and dot density=62.5%;
when mask 24, p[j][i]=L and dot density=62.5%;
when mask 25, p[j][i]=C and dot density=50%;
when mask 26, p[j][i]=C and dot density=50%;
when mask 27, p[j][i]=C and dot density=50%;
when mask 28, p[j][i]=C and dot density=50%;
when mask 29, p[j][i]=C and dot density=50%;
when mask 30, p[j][i]=C and dot density=50%;
when mask 31, p[j][i]=C and dot density=50%; and
when mask 32, p[j][i]=C and dot density=50%.

The output value of first processor 920 is stored in the register of Dp[j][i] according to the above result. The second processor 930 receives and processes the output from the first processor 920. Each of parallel processors 921–929 sets the output into zero when the input 3×3 sample window does not coincide with any one of mask 1 through mask 32.

TABLE 1

| D2 | D1 | D0 | density |
| --- | --- | --- | --- |
| 0 | 0 | 0 | 0% (bitmap=0) |
|   |   |   | 100% (bitmap=1) |
| 0 | 0 | 1 | 12.5% |
| 0 | 1 | 0 | 25% |

TABLE 1-continued

| 1 | 0 | 0 | 50% |
| --- | --- | --- | --- |
| 1 | 0 | 1 | 62.5% |
| 1 | 1 | 0 | 75% |

| D5 | D4 | D3 | direction |
| --- | --- | --- | --- |
| 0 | 0 | 0 | center-right; CR |
| 0 | 0 | 1 | center-left; CL |
| 0 | 1 | 0 | top/bottom; TB |
| 0 | 1 | 1 | center; C |
| 1 | 0 | 0 | right; R |
| 1 | 1 | 0 | left; L |

The pixel p[2][2] is a pixel to be currently processed among the processing result of first processor 920 as the center pixel. Accordingly, when the pixel is not processed in second processor 930, the processing result of first processor 920 can become an input to signal modulator 940, the pixel should have values of both the direction and density. The values of Dp[j][i][D(5:0)] coming from the processing result of first processor 920 should have information of the following contents according to the set of bits. When Dp[j][i][D2]=1, the density information is p[j][i]=50% or 62.5%, thereby indicating that the information has been processed in first processor 920. When Dp[j][i][D4]=1, the direction information is p[j][i] can be top or bottom (TB) information. When Dp[j][i][D5]=1, the direction information is p[j][i] can be right or left (RL) information.

Figure 14A:
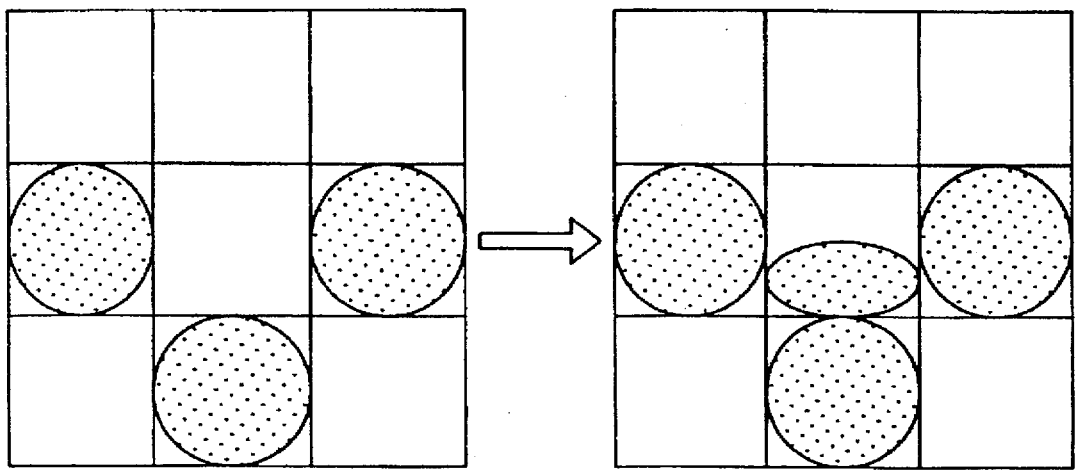
FIGS. 14A–14D each show pattern diagrams of the before and after results of image data processed according each pixel arrangement in the first processor of FIG. 9.
Figure 14B:
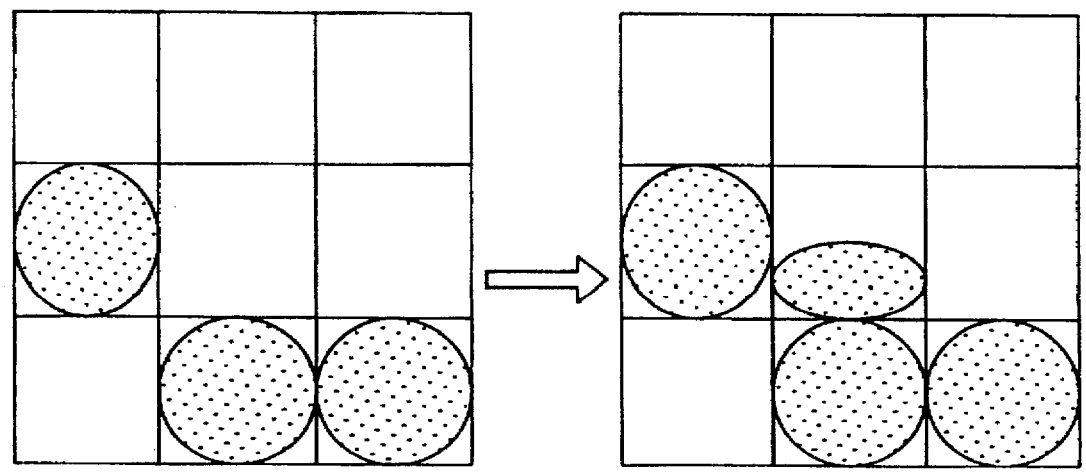
Figure 14C:
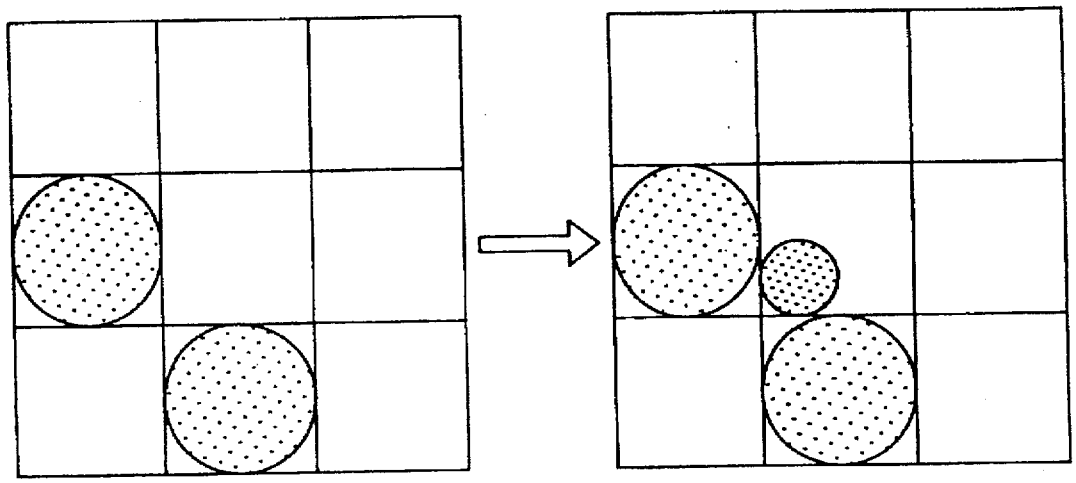
Figure 14D:
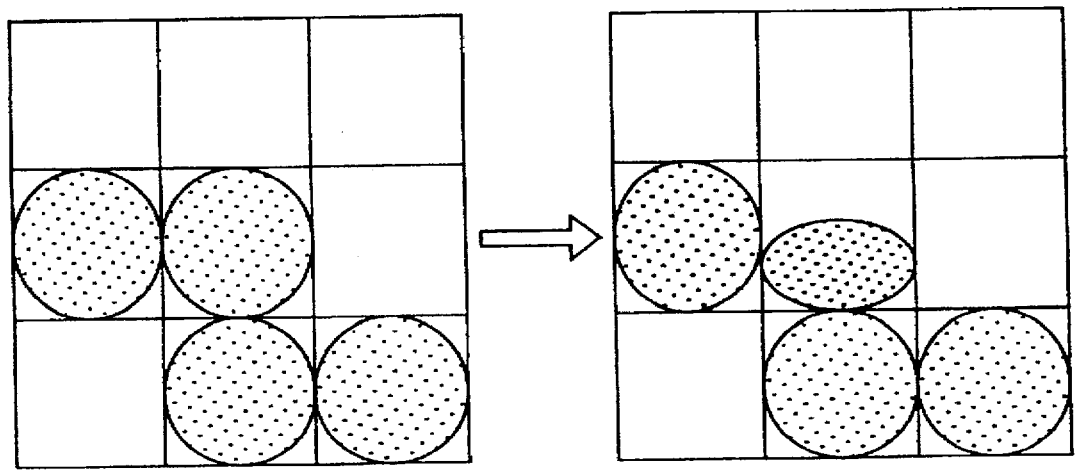

During the time when second processor 930 processes the output of first processor 920, first processor 920 reads a 5×5 sample window of the following row from memory portion 910 and processes the read result. That is, first processor 920 sends the processing result to second processor 930 according to the pixel clock of FIG. 9 and operates in a pipeline manner in which another input is received from memory portion 910 and processed and the received input is processed. In case of mask 1 to mask 4 among objects to be processed in first processor 920, that is, in the case of a dot pattern having a groove shape, a 50% pixel is filled in the groove as shown in FIG. 14A. By filling this groove, a change between the dots is reduced to produce a smooth pattern. In case of mask 5 to mask 12, that is, in case of a dot pattern having horizontal and vertical lines and inclined lines, a 50% pixel is filled to reduce an abrupt change as shown in FIG. 14B. That is, the filled pixel smoothens an instantaneous change between pixels, such that the inclination is softened. In the case of mask 13 to mask 16, a 25% pixel is filled, to remove a step phenomenon in a 45° dot pattern as shown in FIG. 14C. In the case of mask 17 to mask 24, a 100% pixel is changed into a 62.5% pixel in a dot pattern having vertical, horizontal and inclined lines, to reduce an abrupt change as shown in FIG. 14D.

Second processor 930 determines the group to which Dp[j][i] being an output of first processor 920 belongs, among the following four groups.

Group A: portions such that the magnitude thereof should be reduced to 75% and which is processed to have direction information among current "1" pixels Group B: portions such that the magnitude thereof has not been changed (as 100%) and which is processed so as to have direction information among current "1" pixels Group C: portions such that the magnitude thereof becomes a 25% pixel among current "0" pixels; or a 50% pixel, being the first processing result, is processed to a 12.5% to reduce a width of variation between the pixels and to have direction information Group D: portions such that the magnitude thereof is processed to 50%, to sharpen the shape of an edge acute angle among current "0" pixels Pixel data Mxy plays an important role in determining the group and represents the density of a pixel located in a particular position. In the pixel data Mxy, the "x" value represents pixel position. In more detail:

M1y represents the density of pixel p[1][2];
M2y represents the density of pixel p[3][2];
M3y represents the density of pixel p[2][1]; and
M4y represents the density of pixel p[2][3].

Here, the density value of each pixel is varied according to the "y" value. In more detail:

If Dp[j][i][bitmap, D2]="00", then Mx0=1;
If Dp[j][i][bitmap, D2]="01" or "11", then Mx1=1;
If Dp[j][i][bitmap, D2]="10", then Mx2=1;
If Mx0=1, then the pixel density is 0%;
If Mx1=1, then the pixel density is 50% or 62.5%; and
If Mx2=1, then the pixel density is 100%.

For example, if M12=1, the pixel density of p[1][2] is 100%; and if M30=1, the pixel density of p[2][1] is 0%.

The Mxy values are used for determining the group (A, B, C or D), according to the result of first processor 920. Referring to the classification of groups according to Mxy, a classifying method thereof is shown in Table 2. For example, when M12=1, M21=1, M32=1 and M40=1, the pixel data can be classified in Group A. Here, the Mxy value is determined logically according to the above description.

TABLE 2

| M1, M2 | M3, M4 | group |
|---|---|---|
| M12=1, M21=1 or M11=1, M22=1 | M32=1, M40=1 | A |
| M12=1, M21=1 or M11=1, M22=1 | M30=1, M42=1 | A |
| M12=1, M20=1 | M31=1, M41=1 or M31=1, M42=1 | A |
| M10=1, M22=1 | M31=1, M41=1 or M31=1, M42=1 | A |
| M12=1, M21=1 or M11=1, M22=1 | M31=1, M41=1 or M31=1, M42=1 | B |
| M11=1, M21=1 | M32-1, M40=1 or M30=1, M42=1 | A |
| M12=1, M20=1 or M10=1, M22=1 | M31=1, M41=1 | |
| M12=1, M20=1 | M31=1, M40=1 | C |
| M12=1, M20=1 | M30=1, M41=1 | C |
| M10=1, M22=1 | M31=1, M40=1 | C |
| M10=1, M22=1 | M30=1, M41=1 | C |
| M11=1, M20=1 | M32=1, M40=1 | C |
| M10=1, M21=1 | M32=1, M40=1 | C |
| M11=1, M20=1 | M30=1, M42=1 | C |
| M10=1, M21=1 | M30=1, M42=1 | C |

Pixel data is classified into Group A under the following conditions:

(1) when one y equals 2 and the other equals 0 for M1y=1 and M2y=1 (i.e., 100% and 0%, respectively) among pixels p[1][2] and p[3][2], and one y equals 1 and the other equals 2 for M3y=1 and M4y=1 (i.e., 62.5% or 50%, and 100%, respectively) among pixels p[2][1] and p[2][3]; and (2) when one y equals 2 and the other equals 0 for M3y=1 and M4y=1 (i.e., 100% and 0%, respectively) among pixels p[2][1] and p[2][3], and one y equals 1 and the other equals 2 for M1y=1 and M2y=1 (i.e., 62.5% or 50%, and 100%, respectively) among pixels p[1][2] and p[3][2].

Figure 15:
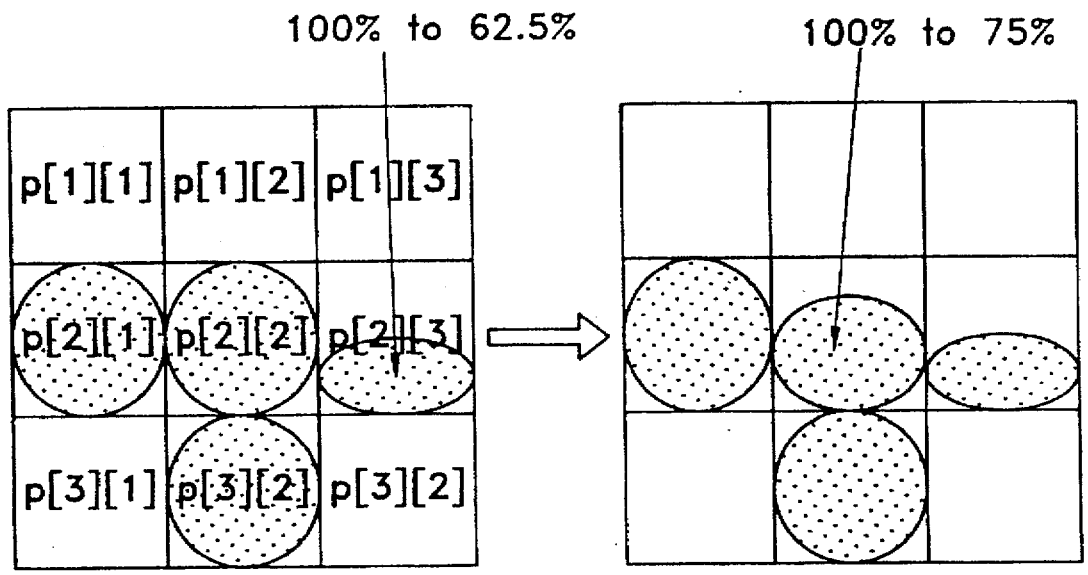
FIG. 15 shows a pattern diagram of the Group-A results of the first and second processors of FIG. 9.

FIG. 15 shows the processing result corresponding to Group A in second processor 930. The Group A is a portion where a 100% pixel beside a 62.5% pixel should be changed into a 75% pixel, to smooth the connection between lines. However, if D2 among p[1][3] and p[3][3] is "1," then, pixels p[1][3] and p[3][3] are processed in first processor 920 and become 50% and 62.5% pixels, respectively. Accordingly, since the amount of variation between pixels p[1][3] and p[2][2] becomes large when the latter is to be processed, it should not be. Thus, pixel p[2][2] is processed into a 75% pixel when D2 of pixels p[1][3] is "0"; that is, pixels p[1][3] are 0% pixels.

Pixel data is classified into Group B when one y equals 1 and the other equals 2 for M1y=1 and M2y=1 (i.e., 62.5% or 50%, and 100%, respectively) among pixels p[1][2] and p[3][2], and one y equals 1 and the other equals 2 for M3y=1 and M4y=1 (i.e., 50% and 100%, respectively) among pixels p[2][1] and p[2][3].

Figure 16:
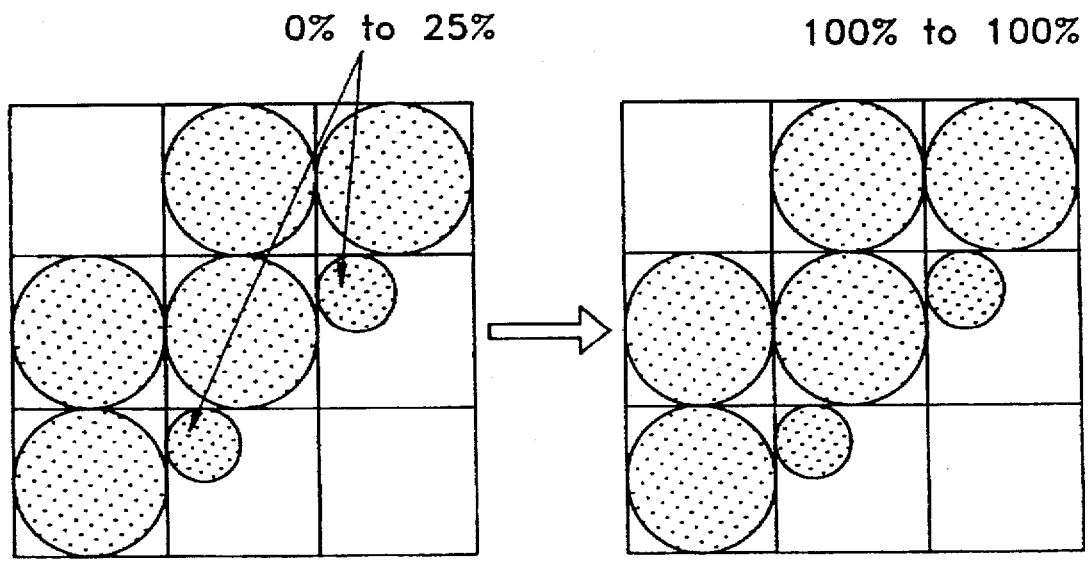
FIG. 16 shows a pattern diagram of the Group-B results of the first and second processors of FIG. 9.

FIG. 16 shows the processing result of a 3×3 sample window corresponding to Group B in second processor 930. When pixel p[2][2] is 100% and 25% pixels exist in the neighborhood thereof, the pixel p[2][2] is not changed.

Pixel data is classified into Group C under the following conditions:

(1) when one y equals 2 and the other equals 0 for M1y=1 and M2y=1 (i.e., 100% and 0%, respectively) among pixels p[1][2] and p[3][2], and one y equals 1 and the other equals 0 for M3y=1 and M4y=1 (i.e., 50% and 0%, respectively) among pixels p[2][1] and p[2][3]; and (2) when one y equals 2 and the other equals 0 for M3y=1 and M4y=1 (i.e., 100% and 0%, respectively) among pixels p[2][1] and p[2][3], and one y equals 1 and the other equals 0 for M1y=1 and M2y=1 (i.e., 50% and 0%, respectively) among pixels p[1][2] and p[3][2].

Figure 17A:
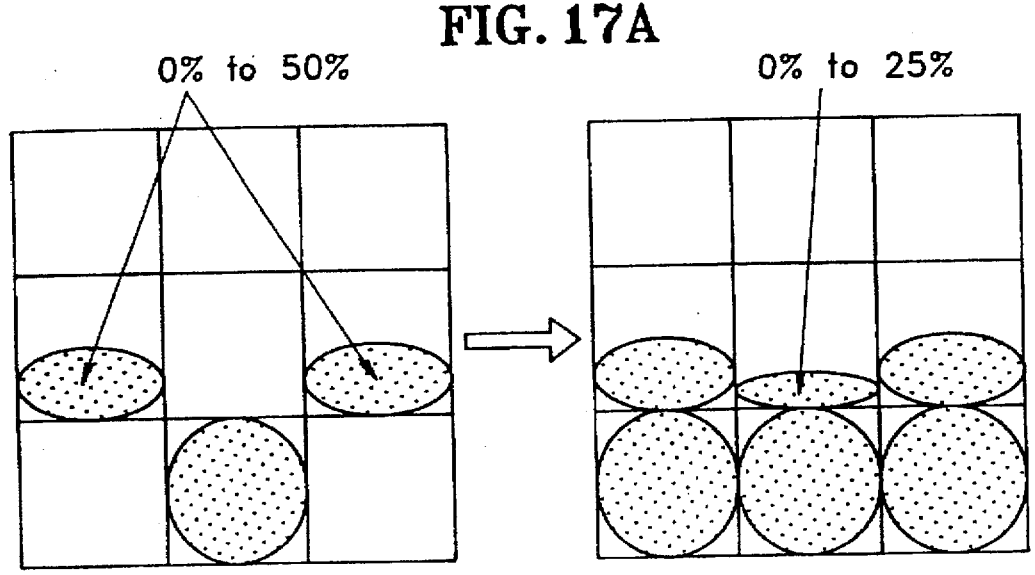
FIGS. 17A–17C each show pattern diagrams of the Group-C results of the first and second processors of FIG. 9.
Figure 17B:
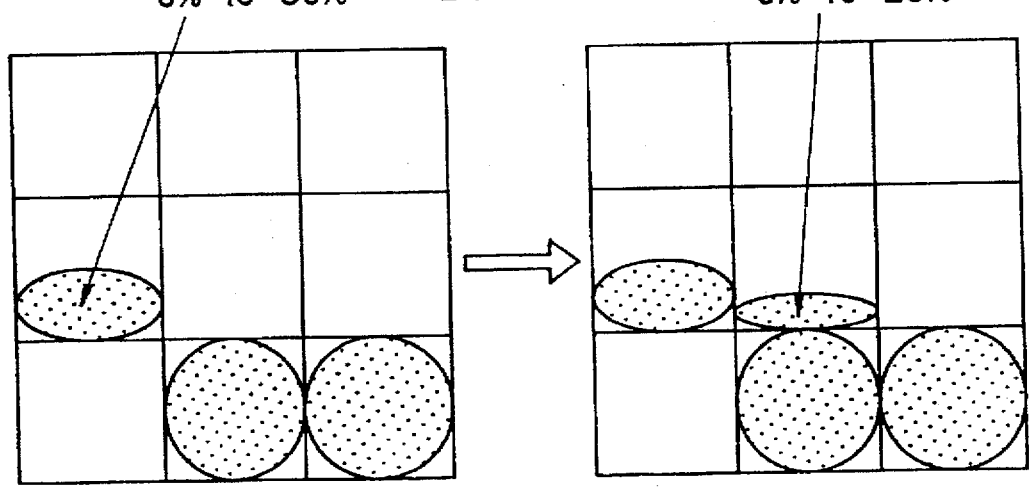
Figure 17C:
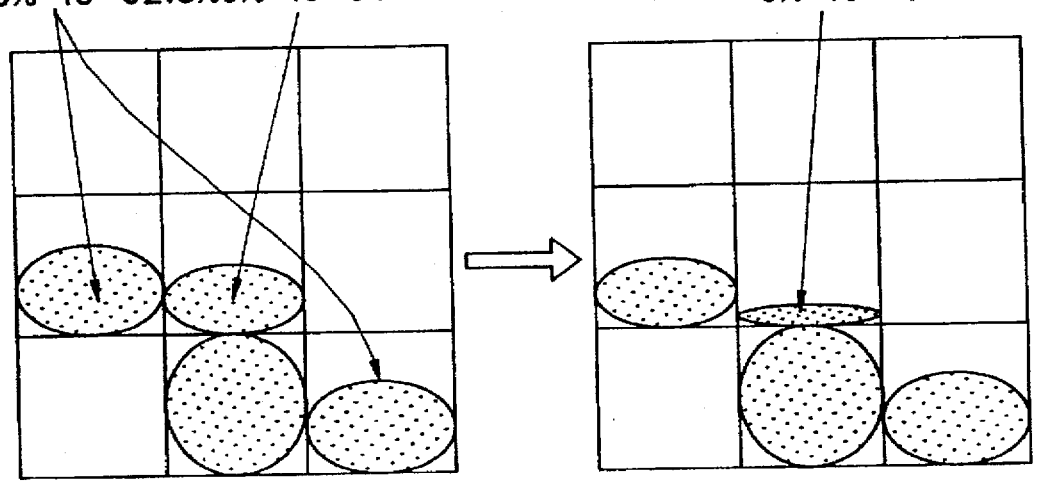

FIGS. 17A–17C show examples of downward-oriented dots among the processing results of the 3×3 sample window corresponding to Group C in second processor 930. In FIG. 17A, when pixels p[2][1] and p[2][3] are both 50% pixels and pixel p[2][2] is a 0% pixel, a 25% pixel is filled in pixel p[2][2], to make for a smoother pixel transition. In FIG. 17B, when pixel p[2][2] is a 0% pixel, pixel p[2][1] is 50%, and pixels p[3][2] and p[3][3] are both 100%, a 25% pixel is filled in pixel p[2][2]. In FIG. 17C, when pixel p[2][2] is 50%, pixel p[2][1] is 62.5%, pixel p[3][2] is 100% and p[3][3] is 62.5%, pixel p[3][3] has a large variation with respect to the center pixel p[2][2]. Accordingly, pixel p[2][2] needs to be reduced from 25% to 12.5%.

Group D is processed using the bitmap pattern of each pixel and the resultant direction and density information of first processor 920, as in Table 3, instead of using the Mxy value.

Figure 18A:
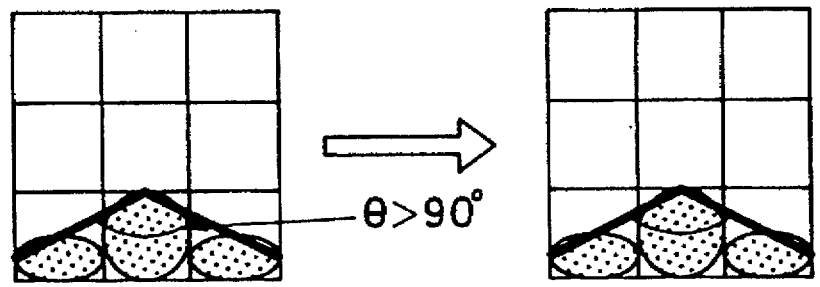
FIGS. 18A–18C each show pattern diagrams of results before and after processing the Group-D image data in the second processor of FIG. 9.
Figure 18B:
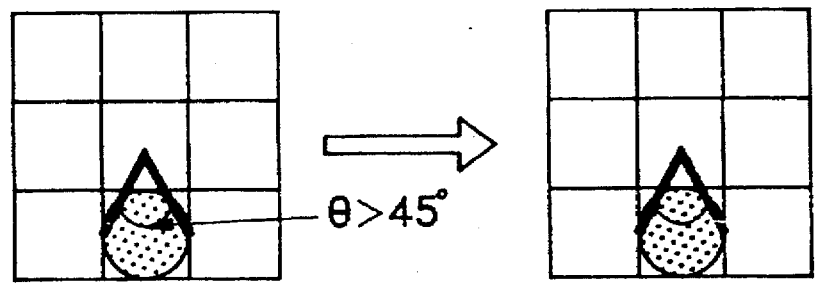
Figure 18C:
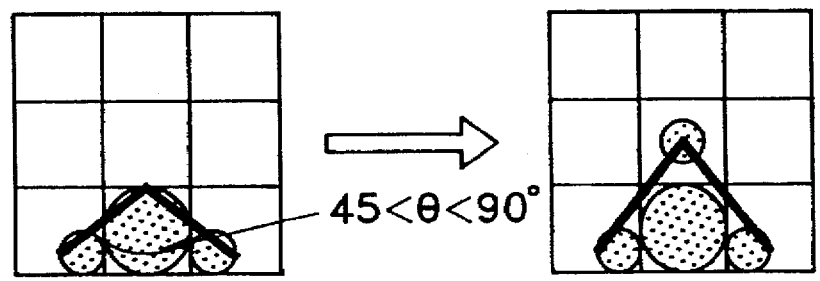

FIGS. 18A–18C show processing results with respect to Group D, i.e., an acute angle between 45° and 90°. Here, since an acute angle of less than 45° is an end portion of the line or shows up in a gothic font, it is not processed. Table 3 is a logic table of the processing of Group D with Direction C.

TABLE 3a

| | | bitmap | | | | | | | | | direction | | | | output data | | | | | | |
|---|---|---|---|---|---|---|---|---|---|---|---|---|---|---|---|---|---|---|---|---|---|
| | | | | | | | | | | | P11 | P13 | P31 | P33 | | | | | | | |
| gothic_l | gothic_r | 11 | 12 | 13 | 21 | 22 | 23 | 31 | 32 | 33 | D5 | D5 | D5 | D5 | D6 | D5 | D4 | D3 | D2 | D1 | D0 |
| 1 | X | 0 | 0 | 0 | 1 | 0 | 0 | 0 | 0 | 0 | 0 | X | 0 | X | 1 | 0 | 1 | 1 | 1 | 0 | 0 |
| X | 1 | 0 | 0 | 0 | 0 | 0 | 1 | 0 | 0 | 0 | X | 0 | X | 0 | 1 | 0 | 1 | 1 | 1 | 0 | 0 |

NOTE:
gothic_l ← [(p11[D2]=1) or (p31[D2]=1)],
gothic_r ← [(p13[D2]=1) or (p33[D2]=1)],
gothic_t ← [(p11[D2]=1) or p13[D2]=1)], and
gothic_b ← [(p31[D2]=1) or (p33[D2]=1)].

TABLE 3b

| | | bitmap | | | | | | | | | | | output data | | | | | |
|---|---|---|---|---|---|---|---|---|---|---|---|---|---|---|---|---|---|---|
| gothic_t | gothic_b | 11 | 12 | 13 | 21 | 22 | 23 | 31 | 32 | 33 | DDMFt | DDMFb | D6 | D5 | D4 | D3 | D2 | D1 | D0 |
| 1 | X | 0 | 1 | 0 | 0 | 0 | 0 | 0 | 0 | 0 | 0 | X | 1 | 0 | 1 | 1 | 1 | 0 | 0 |
| X | 1 | 0 | 0 | 0 | 0 | 0 | 0 | 0 | 1 | 0 | 0 | 0 | 1 | 0 | 1 | 1 | 1 | 0 | 0 |

NOTE:
[(p11[D5:D4]=01) or (p13[D5:D4]=01)] → DDMFt, and
[(p31[D5:D4]=01) or (p33[D5:D4]=01)] → DDMFb.

In the above Tables 3a & 3b, if e>45°, then gothic_l=1 (left); if e>45°, then gothic_r=1 (right); if e>45°, then gothic_t=1 (top); if e>45°, then gothic_b=1 (bottom); if e>90°, then p[1][3]=0 and p[3][3][D5]=0 (left); if e>90°, then p[1][1]=0 and p[3][1][D5]=0 (right); if e>90°, then DDMFt=0 (top); and if e>90°, then DDMFb=0 (bottom).

When an angle between pixel dots is determined as an acute angle, a center 50% pixel is filled in the position of the pixel p[2][2], to increase sharpness of the acute angle. When the pixel dot pattern does not belong to any of Groups A to D, an output result of the second step processing becomes the output result Dp[2][2] of the first step processing.

Figure 19A:
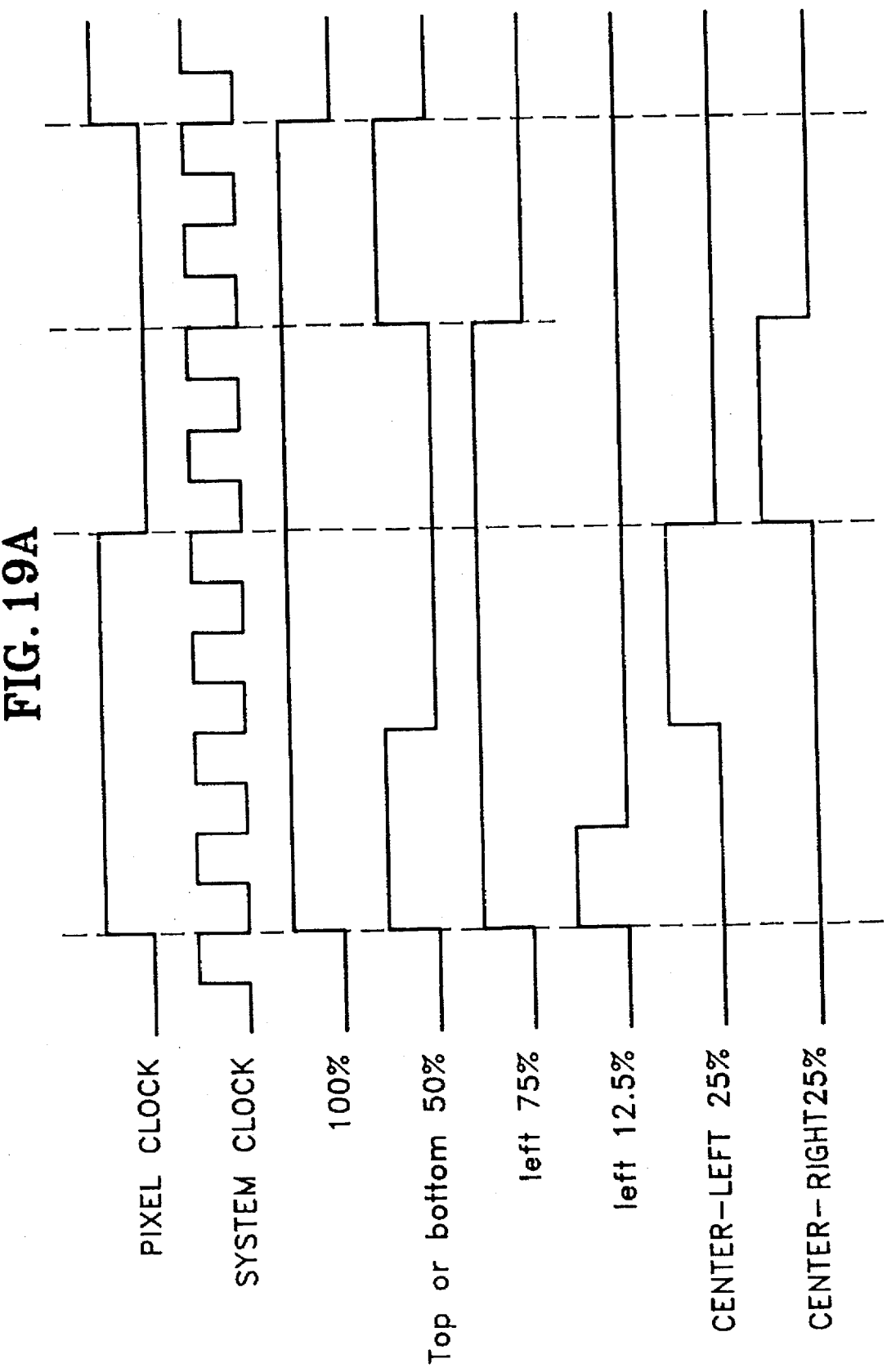
FIGS. 19A and 19B show output waveform diagrams of the signal modulator shown in FIG. 9, in the "8" and "4" modes, respectively.
Figure 19B:
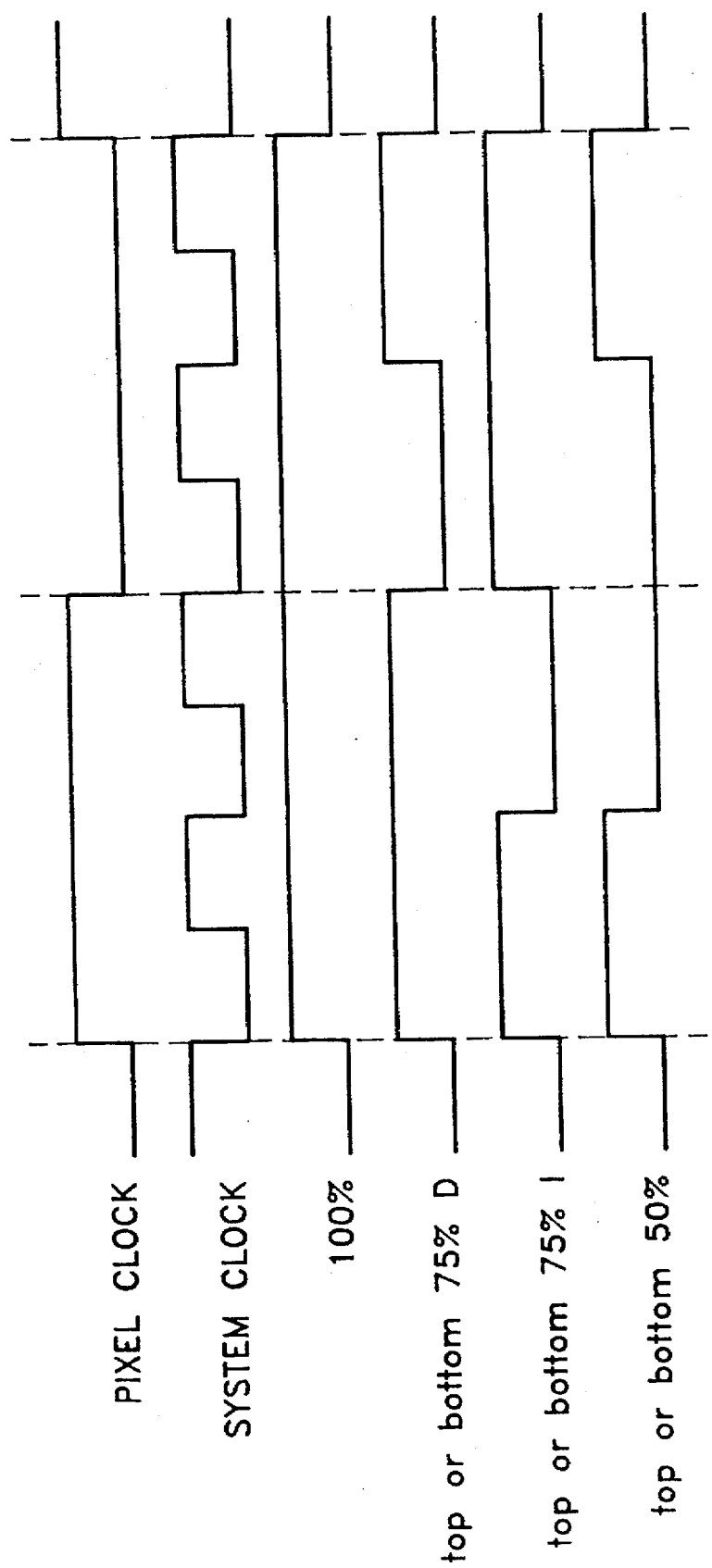

Signal modulator 130 of FIG. 9 determines a shape of modulation according to the result of second processing portion 120 and produces a modulated signal. Table 4 represents the output result of second processing portion 120 and the modulation shape determined according to a thickness flag and ⅛-mode flag. D6 represents bitmap data. In Table 4, the DF(t+1) value becomes "1" when the density is 100% or TB75% and DF(t)=1. In 4-mode operation, TB75% has two kinds of modulation patterns according to the DF(t) value. That is, the variable DF is the initial value of a decrease flag, and a flag for processing TB75%D in 4-mode operation when the magnitude of a pixel is gradually decreased. In 4-mode operation, the TB75%I modulation signal stipulates that the following pixel density is larger than the current pixel density and more driving pulses are given to the following pixel as in FIG. 20A, while a TB75%D modulation signal stipulates that is defined that the previous pixel density is larger than the current pixel density and more driving pulses are given to the previous pixel as in FIG. 20B. FIGS. 19A and 19B show various modulation signals with respect to 8-mode and 4-mode operations, respectively. In FIG. 19A, when the top or bottom pixel is 50%, two system clock pulses are given as a driving signal, for each half-cycle of the pixel clock period. Also, in FIG. 19A, in the case of left 75%, since six system clock pulses are given for the first two-third of the pixel clock period, a driving signal is given to the left by 75%. Since the other waveforms in FIG. 19A are apparent to the skilled artisan, the detailed descriptions thereof will be omitted. FIG. 19A shows the 8-mode case in which eight system pulses correspond to each pixel clock pulse, while FIG. 19B shows the 4-mode case in which four system clock pulses correspond to one pixel clock pulse. In FIG. 19B, in the case of the top or bottom 75%D, since, as above, two system clock pulses are given as a driving signal, for each half-cycle of the pixel clock period. The driving signal occupies 75% of one pixel clock pulse in a decreasing form from the left. For example, as shown in Table 4, when the value of the result Dp[2][2][D5:D0] of second processor 930 is "000100," the modulated pattern has a CR25% value in both 8-mode and 4-mode operation, and when Dp[2][2][D5:D0] is "001100," the modulated pattern has a CL25% value in both cases. The format and size of the modulated pixel are shown in FIGS. 21A and 21B. In the case of the top or bottom pixels, 75%, 50% and 25% pixels can be embodied in the 8-mode, while 75% and 50% pixels can be embodied in the 4-mode, of which the modulation pattern is limited in comparison with the cases of the left and right directions. Concerning the density values which cannot be embodied due to the limited modulation pattern of the top or bottom direction, the pixels are made to have the density closest to the value of the density. When there exist two "closest" density values, a thickness flag (TF), that is, a flag representing thickness, is used. Thus, when the TF value is "1," printing is performed in the density of a thicker side, while when the TF value is "0," the printing is performed in the density of a thinner side. In Table 4, if pixel [D2:D1:D0] is "100," the CR and CL values should be 50%, in view of Table 1. However, in this embodiment, since processing a 25% modulation pattern can reduce the width of an actual change, only 25% modulation has been performed.

TABLE 4

| TF | DF (t) D6 | D6 | D5 | D4 | pixel data D3 | D2 | D1 | D0 | DF (t+1) 0 | dot pattern 8-mode | 4-mode |
|---|---|---|---|---|---|---|---|---|---|---|---|
| X | X | X | 0 | 0 | 0 | 1 | 0 | 0 | 0 | CR 25% | CR 25% |
| X | X | X | 0 | 0 | 1 | 1 | 0 | 0 | 0 | CL 25% | CL 25% |
| X | X | 1 | X | X | X | 0 | 0 | 0 | 1 | 100% | 100% |
| X | X | 0 | X | X | X | 0 | 0 | 0 | 0 | 0% | 0% |
| X | X | X | 0 | 1 | 1 | 1 | 0 | 0 | 0 | CC 50% | CC 50% |
| X | X | X | 0 | 1 | 1 | 1 | 1 | 0 | 1 | CC 100% | CC 100% |
| 0 | X | X | 0 | 1 | 0 | 0 | 0 | 1 | 0 | 0% | 0% |
| 1 | X | X | 0 | 1 | 0 | 0 | 0 | 1 | 0 | TB 25% | 0% |
| 0 1 | X | X | 0 | 1 | 0 | 0 | 1 | 0 | 0 | TB 25% | 0% TB 25% |
| X | X | X | 0 | 1 | 0 | 1 | 0 | 0 | 0 | TB 50% | TB 50% |
| 0 | X | X | 0 | 1 | 0 | 1 | 0 | 1 | 0 | TB 50% | TB 50% |
| 1 | 0 | X | 0 | 1 | 0 | 1 | 0 | 1 | 0 | TB 75% | TB 75% I |
| 1 | 1 | X | 0 | 1 | 0 | 1 | 0 | 1 | 1 | TB 75% | TB 75% D |
| X | 0 | X | 0 | 1 | 0 | 1 | 1 | 0 | 0 | TB 75% | TB 75% I |
| X | 1 | X | 0 | 1 | 0 | 1 | 1 | 0 | 1 | TB 75% | TB 75% D |
| 1 | X | X | 0 | 0 | 0 | 1 | 1 | 1 | 1 | 100% | 100% |
| X | X | X | 1 | 0 | 0 | 0 | 0 | 1 | 0 | R 12.5% | 0% |
| X | X | X | 1 | 0 | 0 | 0 | 1 | 0 | 0 | R 25% | R 25% |
| X | X | X | 1 | 0 | 0 | 1 | 0 | 0 | 0 | R 50% | R 50% |
| X | X | X | 1 | 0 | 0 | 1 | 0 | 1 | R | R 62.5% | R 50% |
| X | X | X | 1 | 1 | 0 | 1 | 1 | 0 | 1 | R 75% | R 75% |
| X | X | X | 1 | 0 | 0 | 0 | 0 | 1 | 0 | L 12.5% | 0% |
| X | X | X | 1 | 1 | 0 | 0 | 1 | 0 | 0 | L 25% | L 25% |
| X | X | X | 1 | 1 | 0 | 1 | 0 | 0 | 0 | L 50% | L 50% |
| X | X | X | 1 | 1 | 0 | 1 | 0 | 1 | 0 | L 62.5% | L 50% |
| X | X | X | 1 | 1 | 0 | 1 | 1 | 0 | 1 | L 75% | L 75% |

As an example of the first processing and the second processing, a complete processing example is shown in FIGS. 20A–20F. A dot pattern of a 5×5 sample window prior to being processed, a dot pattern after processing in first processor 920, and a dot pattern after processing in second processor are shown in each of FIGS. 20A–20F.

Figure 20A:
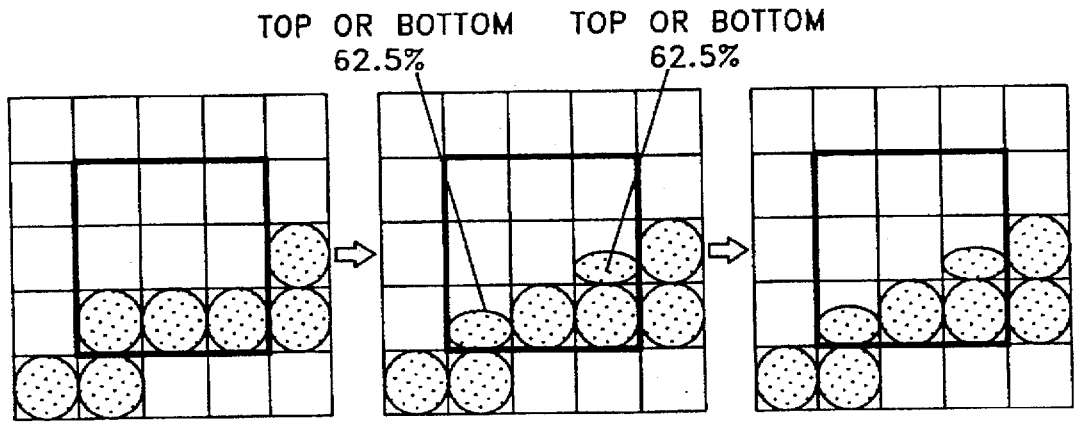
FIGS. 20A–20F each show examples of the results before processing the image data, after firstly processing the image data, and after secondly processing the image data according to each arrangement, when processing a 5×5 sample window according to an embodiment of FIG. 9, respectively.
Figure 21A:
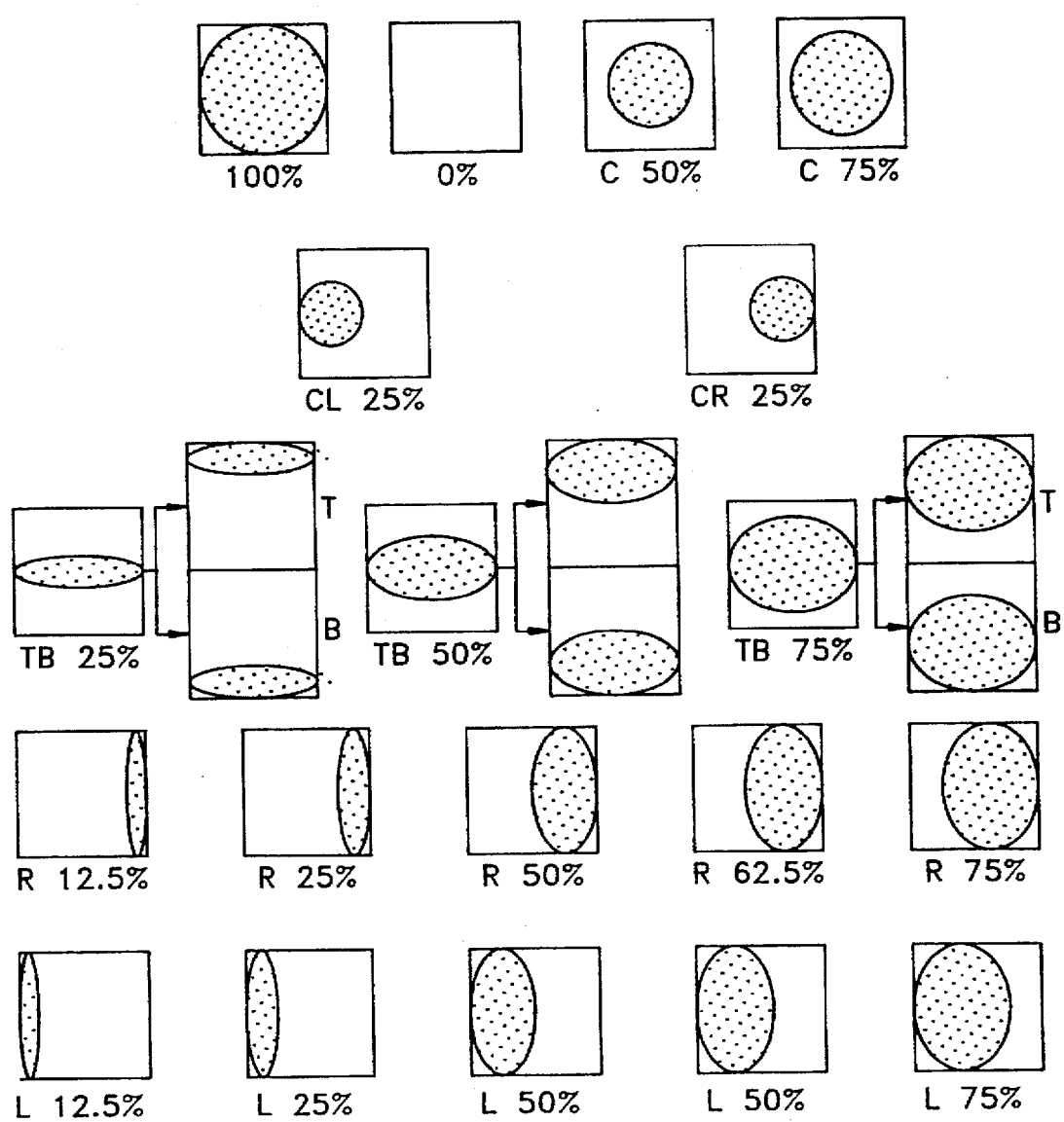
FIGS. 21A and 21B show examples of dot modulation in the "8" and "4" modes, respectively, according to the embodiment of FIG. 9.
Figure 21B:
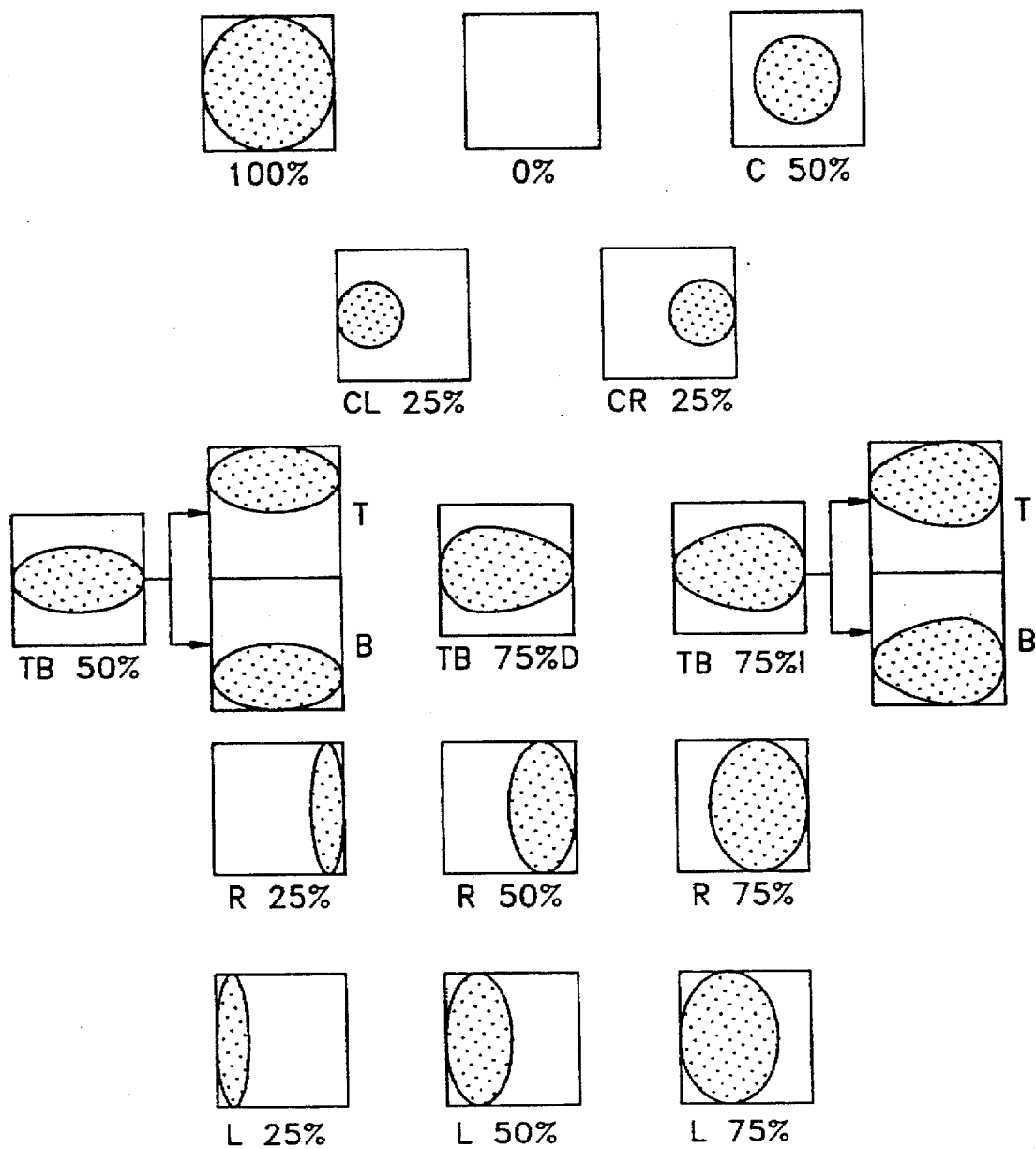

Referring to FIG. 20A, when reviewing the processing of the 5×5 sample window, since pixel p[2][3] and the peripheral eight pixels in first processor 920 are consistent with the mask 6 of FIG. 13, the D2 value becomes "1." Since pixel p[3][1] and the peripheral eight pixels in first processor 920 are consistent with the mask 18 of FIG. 13, the D2 value becomes "1," the D4 value becomes "1," and the D5 value becomes "0." Since pixels p[1][1], p[1][2], p[1][3], p[2][1], p[2][2], p[3][2] and p[3][3] do not belong to any masks of first processor 920, the data values are all "0." The result is shown in Table 5a. In Table 5a, each box represents the output value of the first processing stage. If the Mxy values are obtained by second processor 930, the values of M10, M20, M32 and M41 are all "1," which corresponds to Group C. Since the D2 value of pixel p[3][1] is "1" in Group C, the variation of pixels p[2][2] and p[3][1] is more severe than pixels p[2][3] and p[2][2]. Thus, the second processing stage does not further process the result of the first processing stage.

TABLE 5a (output of FIG. 20A)

| p[1] [1] D5=0, D4=0, D2=0 | p[1] [2] D2=0 | p[1] [3] D5=0, D4=0, D2=0 |
|---|---|---|
| p[2] [1] D2=0 | p[2] [2] D5=0, D4=0, D3=0, D2=0, D1=0, D0=0 | p[2] [3] D2=1 |
| p[3] [1] D5=0, D4=1, D2=1 | p[3] [2] D2=0 | p[3] [3] D5=0, D4=0, D2=0 |

Figure 20B:
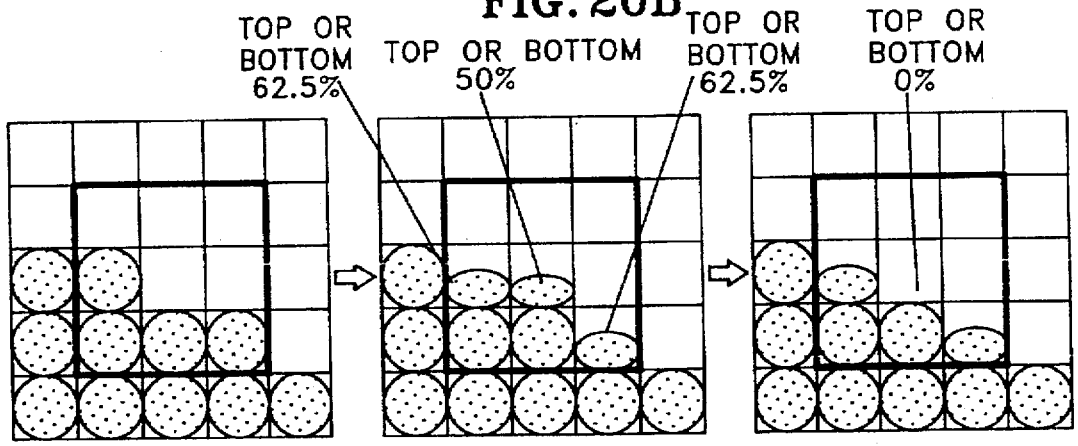

Referring to FIG. 20B, when reviewing the processing of the 5×5 sample window, since pixel p[2][2] and the peripheral eight pixels in first processor 920 are consistent with the mask 23 of FIG. 13, the pixel data becomes the top or bottom 62.5%, and the D0 value becomes "1," the D1 value becomes "0," the D2 value becomes "1," the D3 value becomes "0," the D4 value becomes "1," and the D5 value becomes "0." Since pixel p[2][1] and the peripheral eight pixels in first processor 920 are consistent with the mask 23 of FIG. 13, the D2 value becomes "1." Since pixel p[3][3] is consistent with the mask 23, the pixel data becomes the top or bottom 62.5% and the D2 value is "1," the D4 value is "1," and the D5 value is "0." Since pixels p[1][1], p[1][2], p[1][3], p[2][3], p[3][1], p[3][2] and p[3][3] do not belong to any masks of first processor 920, the data values are all "0." The result is shown in Table 5b. In Table 5b, each box represents the output value of the first processing stage. If the Mxy values are obtained by second processor 930, the values of M10, M22, M31 and M40 are all "1," which corresponds to Group C. since the D2 value of pixel p[2][2] is "1" in Group C, the variation of pixels p[2][2] and p[3][1] is more severe than pixels p[2][1] and p[2][2]. Thus, pixel p[2][2] is processed as 0%.

TABLE 5b (output of FIG. 20B)

| p[1] [1] D5=0, D4=0, D2=0 | p[1] [2] D2=0 | p[1] [3] D5=0, D4=0, D2=0 |
|---|---|---|
| p[2] [1] D2=1 | p[2] [2] D5=0, D4=0, D3=0, D2=0, D1=0, D0=0 | p[2] [3] D2=1 |
| p[3] [1] D5=0, D4=0, D2=0 | p[3] [2] D2=0 | p[3] [3] D5=0, D4=1, D2=1 |

Figure 20C:
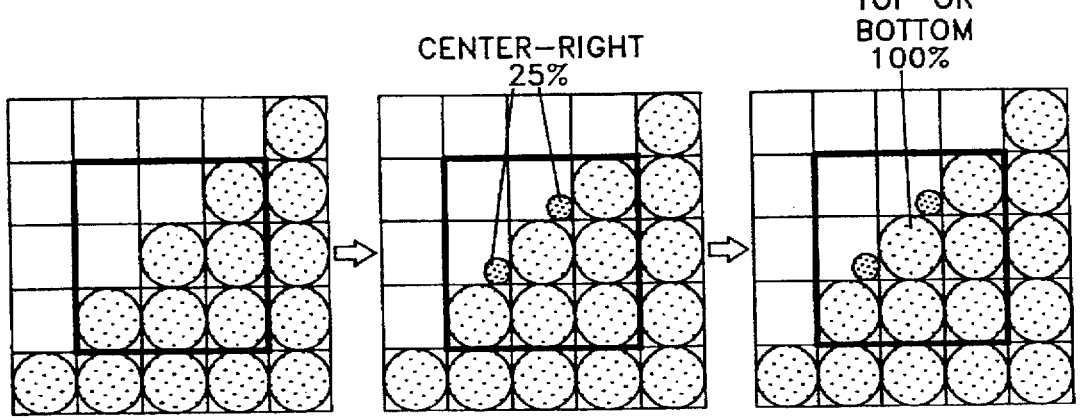

Referring to FIG. 20C, when reviewing the processing of the 5×5 sample window, since pixels p[1][2] and p[3][1] and the peripheral eight pixels in first processor 920 are consistent with the mask 13 of FIG. 13, the pixel data becomes the right center 50%, and the D1 value becomes "1." Since pixels p[1][1], p[1][3], p[2][2], p[2][3], p[3][2] and p[3][3] do not belong to any masks of first processor 920, the data values are all "0." The result is shown in Table 5c. In Table 5c, each box represents the output value of the first processing stage. If the Mxy values are obtained by second processor 930, the values of M11, M22, M31 and M42 are all "1," which corresponds to Group B and has a value of 100%.

TABLE 5c (output of FIG. 20C)

| p[1] [1]           | p[1] [2]                           | p[1] [3]           |
|--------------------|------------------------------------|--------------------|
| D5=0, D4=0, D2=0   | D2=1                               | D5=0, D4=0, D2=0   |
| p[2] [1]           | p[2] [2]                           | p[2] [3]           |
| D2=1               | D5=0, D4=0, D3=0, D2=0, D1=0, D0=0 | D2=0               |
| p[3] [1]           | p[3] [2]                           | p[3] [3]           |
| D5=0, D4=0, D2=0   | D2=0                               | D5=0, D4=0, D2=0   |

Figure 20D:
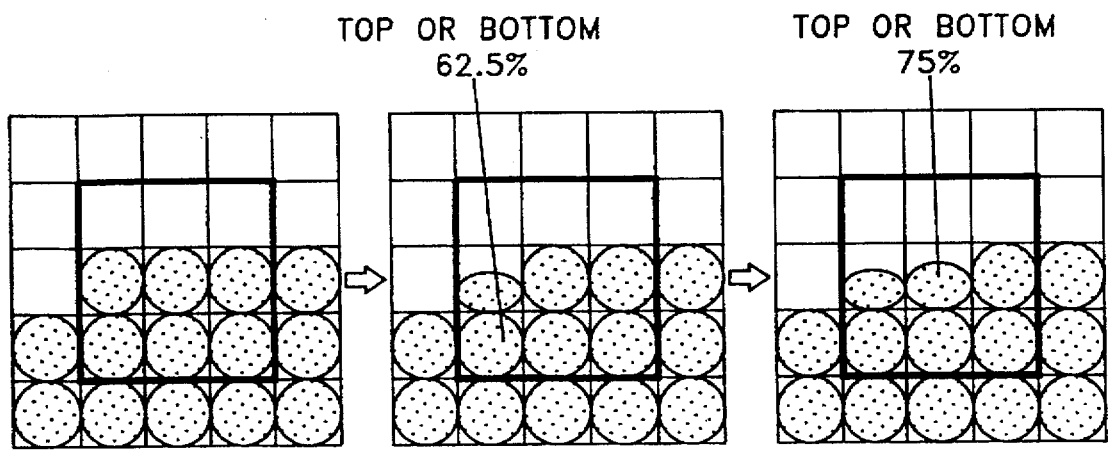

Referring to FIG. 20D, when reviewing the processing of the 5×5 sample window, since pixels p[2][1] and the peripheral eight pixels in first processor 920 are consistent with the mask 18 of FIG. 13, the pixel data becomes the top or bottom 62.5%, and the D0 value becomes "1," the D2 value becomes "1," the D3 value becomes "0," the D4 value becomes "1," and the D5 value becomes "0." Since pixels p[1][1], p[1][3], p[2][2], p[2][3], p[3][2] and p[3][3] do not belong to any masks of first processor 920, the data values are all "0." The result is shown in Table 5d. In Table 5d, each box represents the output value of the first processing stage. If the Mxy values are obtained by second processor 930, the values of M10, M22, M31 and M42 are all "1," which corresponds to Group A and has a value of the top or bottom 100%.

TABLE 5d (output of FIG. 20D)

| p[1] [1]           | p[1] [2]                           | p[1] [1]           |
|--------------------|------------------------------------|--------------------|
| D5=0, D4=0, D2=0   | D2=0                               | D5=0, D4=0, D2=0   |
| p[2] [1]           | p[2] [2]                           | p[2] [3]           |
| D2=1               | D5=0, D4=0, D3=0, D2=0, D1=0, D0=1 | D2=0               |
| p[3] [1]           | p[1] [1]                           | p[3] [3]           |
| D5=0, D4=0, D2=0   | D5=0, D4=0, D2=0                   | D5=0, D4=0, D2=0   |

Figure 20E:
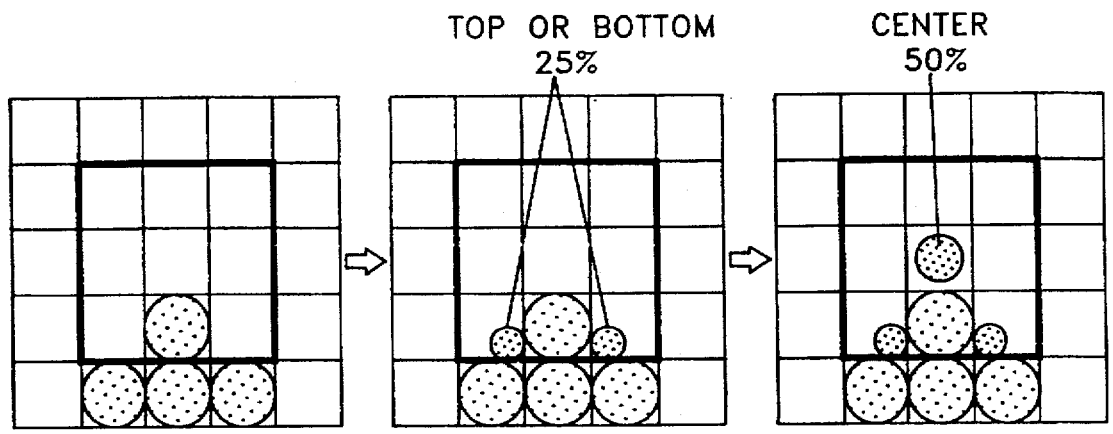

Referring to FIG. 20E, when reviewing the processing of the 5×5 sample window, since pixels p[3][1] and the peripheral eight pixels in first processor 920 are consistent with the mask 13 of FIG. 13, the pixel data becomes the right center 25%, and the D2 value becomes "1," the D4 value becomes "0," and the D5 value becomes "0." Since pixels p[1][1], p[1][2], p[1][3], p[2][2], p[2][3] and p[3][2] do not belong to any masks of first processor 920, the data values are all "0." The result is shown in Table 5e. In Table 5e, each box represents the output value of the first processing stage. In second processor 930, the pixel data is classified into Group D, or forms an acute angle not less than 45° and not more than 90°, a small pixel is printed in the center to further sharpen the acute angle.

TABLE 5e (output of FIG. 20E)

| p[1] [1]           | p[1] [2]                           | p[1] [3]           |
|--------------------|------------------------------------|--------------------|
| D5=0, D4=0, D2=0   | D2=0                               | D5=0, D4=0, D2=0   |
| p[2] [1]           | p[2] [2]                           | p[2] [3]           |
| D2=0               | D5=0, D4=0, D3=0, D2=0, D1=0, D0=0 | D2=0               |
| p[3] [1]           | p[3] [2]                           | p[3] [3]           |
| D5=0, D4=0, D2=1   | D2=0                               | D5=0, D4=0, D2=1   |

Figure 20F:
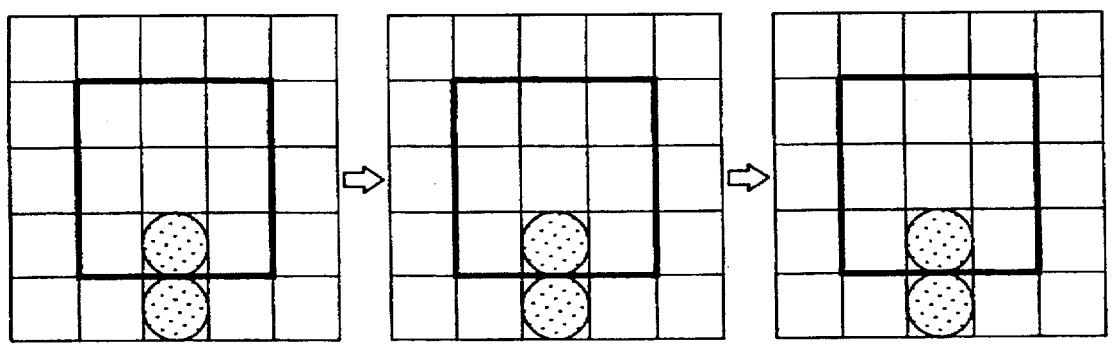

Referring to FIG. 20F, when reviewing the processing of the 5×5 sample window, since pixels p[1][1], p[1][2], p[1][3], p[2][2], p[2][3], p[3][1], p[3][2] and p[3][3] do not belong to any masks of first processor 920, the data values are all "0." The result is shown in Table 5f. In Table 5f, each box represents the output value of the first processing stage. In second processor 930, the pixel data belongs to a candidate of Group D. However, since the pixel data forms an angle not more than 45°, it is not processed.

TABLE 5f (output of FIG. 20F)

| p[1] [1]           | p[1] [2]                           | p[1] [3]           |
|--------------------|------------------------------------|--------------------|
| D5=0, D4=0, D2=0   | D2=0                               | D5=0, D4=0, D2=0   |
| p[2] [1]           | p[2] [2]                           | p[2] [3]           |
| D2=0               | D5=0, D4=0, D3=0, D2=0, D1=0, D0=0 | D2=0               |
| p[3] [1]           | p[3] [2]                           | p[3] [3]           |
| D5=0, D4=0, D2=0   | D2=0                               | D5=0, D4=0, D2=1   |

FIGS. 21A and 21B show examples of dot modulation in the 8-mode and the 4-mode. FIG. 21A shows the dot modulation based on the waveform diagrams of the 8-mode signal modulator of FIG. 19A, and FIG. 21B shows the dot modulation based on the waveform diagrams of the 4-mode signal modulator of FIG. 19B. Referring to FIGS. 21A and 21B, the 8-mode dot modulation has an advantage of an improved resolution of about 50% in comparison with the resolution embodied by the 4-mode dot modulation. However, when using 8-mode dot modulation, the system is more complicated than that using 4-mode dot modulation and the regeneration time is delayed. Thus, it is desirable to use a proper combination of the 4-mode and the 8-mode.

In the embodiment as described above, after obtaining a 5×5 sample window, first and second processing operations are performed to improve the resolution. However, it should be apparent to one skilled in the art that there can be several variations and modifications in which, say, a 7×7 or 9×9 sample window is utilized in the same manner. Here, for example, it is noted that when the 7×7 sample window is used, twenty-five 3×3 sample windows are generated, while when the 9×9 sample window is used, forty-nine 3×3 sample windows are generated, in which case, the increased number of processing stages complicates the system. However, it should be appreciated that resolution of the laser printer according to the present invention can be increased using an M×M sample window.

As described above, the resolution enhancement apparatus of the laser printer according to the present invention minimizes the use of memory by using four row line memories, to thereby effectively reduce memory size by 50% that of the conventional art and, at the same time, save production costs. In the present invention, the resolution enhancement is accomplished by expressing finite shapes according to the maximum nineteen modulation patterns and the nineteen finite pixel expression methods, by removing the portion of severe variation of pixel magnitude, which in turn removes the step phenomenon.

What is claimed is:

1. A resolution enhancement apparatus of a laser printer which reads stored image data and modulates the read image data, said apparatus comprising:

memory means for storing sequentially input image data in a sequential scanning method, rearranging a scanning line order and generating an M×M sample window, M being an integer;

first processing means for classifying and outputting a pattern of the image data according to bitmap information in a pixel using $(M-2)^2$ 3×3 masks produced from the M×M sample window supplied from said memory means;

second processing means for using pixel density to classify the data output from said first processing means into a plurality of groups and outputting data of the classified groups; and signal modulation means for modulating the data output from said second processing means into a predetermined pattern and outputting the modulated pattern.

2. A resolution enhancement apparatus of a laser printer according to claim 1, wherein said memory means comprises:

a memory for storing the received input data;

a sample window generator for reading the data stored in said memory and generating the M×M sample window; and a memory controller for controlling said memory and said sample window generator.

3. A resolution enhancement apparatus of a laser printer according to claim 1, wherein said sample window includes 5×5 pixel data when the value of M is five.

4. A resolution enhancement apparatus of a laser printer according to claim 3, wherein said memory means comprises:

a serial-to-parallel converter for converting received serial input data into parallel output data;

row line memory means for storing the data supplied from said serial-to-parallel converter in the input sequence thereof;

a first register portion for receiving the data from said row line memory means and the output of said serial-to-parallel converter so as to have a 5×8 arrangement;

a rearranger for rearranging an arrangement sequence of the output from said first register;

a second register for storing the rearranged data so as to have a 5×5 arrangement; and a memory controller for controlling said serial-to-parallel converter, said row line memory means, said first register, said rearranger and said second register.

5. A resolution enhancement apparatus of a laser printer according to claim 4, further comprising a demultiplexer for demultiplexing the input data between said serial-to-parallel converter and said row line memory means.

6. A resolution enhancement apparatus of a laser printer according to claim 4, wherein said row line memory means comprises four row line memories for storing one row of data each.

7. A resolution enhancement apparatus of a laser printer according to claim 1, wherein said sample window includes 7×7 pixel data when the value of M is seven.

8. A resolution enhancement apparatus of a laser printer according to claim 1, wherein said sample window includes 9×9 pixel data when the value of M is nine.

9. A resolution enhancement apparatus of a laser printer according to claim 1, wherein said first processing means performs pattern classification according to bitmap information within a 3×3 sample window using thirty-two masks and outputting the pattern-classified result.

10. A resolution enhancement apparatus of a laser printer according to claim 1, wherein said second processing means classifies pixel data into four groups using the densities of the top, bottom, left and right pixels.

11. A resolution enhancement apparatus of a laser printer according to claim 10, wherein said second processing means changes a 50% pixel into a 0% pixel when the 50% pixel is severely changed in one group classified in said second processing means, after the processing of said first processing means.

12. A resolution enhancement apparatus of a laser printer according to claim 1, wherein the output data of said second processing means is classified into direction and density information, in which the output data is classified into six directions and seven densities.

13. A resolution enhancement apparatus of a laser printer according to claim 1, wherein said second processing means determines the proceeding direction of a pixel using the direction information of said first processing means.

14. A resolution enhancement apparatus of a laser printer according to claim 13, wherein, in order to discriminate acute and obtuse angles of one group, said second processing means determines that a candidate of an acute angle portion is an obtuse angle if the direction information of both pixels is different from the proceeding direction of the candidate and that the candidate is an acute angle if the direction information of both pixels is the same as the proceeding direction of the candidate.

15. A resolution enhancement apparatus of a laser printer according to claim 1, wherein said signal modulation means classifies top and bottom 75% pixels as a top/bottom 75% increase or a top/bottom 75% decrease.

16. A resolution enhancement apparatus of a laser printer according to claim 1, wherein said first and second processing means use a sequential pyramid pattern via a basic 3×3 processing and performs a multiple processing of the basic 3×3 processing.

17. A resolution enhancement apparatus of a laser printer according to claim 1, wherein said signal modulation means discriminates 8-mode and 4-mode operation according to system drive capability and sets the mode according to system speed, to enable the resolution enhancement apparatus to be applied to various printers.

18. A resolution enhancement method of a laser printer which reads image data in a memory and modulates the read image data under the control of a controller, said method comprising the steps of:

storing sequentially input image data in a sequential scanning method, rearranging a scanning line order and generating an M×M sample window, M being an integer;

firstly processing by classifying and outputting a pattern of the image data according to bitmap information in a pixel using $(M-2)^2$ 3×3 masks produced from the M×M sample window supplied from the memory;

secondly processing by using pixel density to classify data output from said first processing step into a plurality of groups and outputting data of the classified groups; and modulating data output from said second processing step into a predetermined pattern and outputting the modulated pattern.

19. A resolution enhancement method of a laser printer according to claim 18, wherein said storage and sample-window-generation step comprises the steps of:

storing the received input data; and reading the data stored in said memory and generating the M×M sample window.

20. A resolution enhancement method of a laser printer according to claim 18, wherein the value of M is five.

21. A resolution enhancement method of a laser printer according to claim 20, wherein said storage and sample-window-generation step comprises the steps of:

converting received serial input data into parallel output data;

storing in the row direction the data supplied from said serial-to-parallel conversion step in the input sequence thereof;

receiving the row-direction-stored data and the result of said serial-to-parallel conversion step so as to have a 5×8 arrangement;

rearranging an arrangement sequence of the 5×8 arrangement data output; and storing the rearranged data so as to have a 5×5 arrangement.

22. A resolution enhancement method of a laser printer according to claim 21, further comprising the step of demultiplexing the input data.

23. A resolution enhancement method of a laser printer according to claim 18, wherein the value of M is seven.

24. A resolution enhancement method of a laser printer according to claim 18, wherein the value of M is nine.

25. A resolution enhancement method of a laser printer according to claim 18, wherein said row-storing step comprises four row-storage sub-steps each for storing one row of data.

26. A resolution enhancement method of a laser printer according to claim 18, wherein said first processing step performs pattern classification according to bitmap information within a 3×3 sample window using thirty-two masks and outputting the pattern-classified result.

27. A resolution enhancement method of a laser printer according to claim 18, wherein said second processing step classifies pixel data into four groups using the densities of the top, bottom, left and right pixels.

28. A resolution enhancement method of a laser printer according to claim 27, wherein said second processing step changes a 50% pixel into a 0% pixel when the 50% pixel is severely changed in one group classified in said second processing step, after said first processing step.

29. A resolution enhancement method of a laser printer according to claim 18, wherein the output data of said second processing step is classified into direction and density information, in which the output data is classified into six directions and seven densities.

30. A resolution enhancement method of a laser printer according to claim 18, wherein said second processing step determines the pixel proceeding direction using the direction information of said first processing step.

31. A resolution enhancement method of a laser printer according to claim 18, wherein, in order to discriminate an acute angle and an obtuse angle of one group, said second processing step determines that a candidate of an acute angle portion is an obtuse angle if the direction information of both pixels is different from the proceeding direction of the candidate, and that the candidate is an acute angle if the direction information of both pixels is the same direction as the proceeding direction of the candidate.

32. A resolution enhancement method of a laser printer according to claim 18, wherein said signal modulation step classifies top and bottom 75% pixels as a top/bottom 75% increase or top/bottom 75% decrease.

33. A resolution enhancement method of a laser printer according to claim 18, wherein said first and second processing steps use a sequential pyramid pattern via a basic 3×3 processing and performs a multiple processing of the basic 3×3 processing.

34. A resolution enhancement method of a laser printer according to claim 18, wherein said signal modulation step discriminates 8-mode and 4-mode operation according to system drive capability and sets the mode according to system speed, to enable the resolution enhancement apparatus to be applied to various printers.

* * * * *